US012400228B1

(12) United States Patent
Krishnaswamy et al.

(10) Patent No.: US 12,400,228 B1
(45) Date of Patent: Aug. 26, 2025

(54) PHONE CASE WITH INTEGRATED COLD WALLET

(71) Applicant: UIPCO, LLC, San Antonio, TX (US)

(72) Inventors: Pooja Krishnaswamy, McKinney, TX (US); Sean Carl Mitchem, San Antonio, TX (US); Mounica Urity, San Antonio, TX (US); Gideon Bowie Luck, Plano, TX (US); Nolan Serrao, Plano, TX (US); Ahmad Ali Shaik, Austin, TX (US); Carlos J P Chavez, San Antonio, TX (US); Ravi Durairaj, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 202 days.

(21) Appl. No.: 18/145,486

(22) Filed: Dec. 22, 2022

(51) Int. Cl.
*H04M 1/21* (2006.01)
*G06Q 20/32* (2012.01)
*G06Q 20/36* (2012.01)
*G06Q 20/40* (2012.01)
*H04B 1/3888* (2015.01)

(52) U.S. Cl.
CPC .......... *G06Q 20/401* (2013.01); *G06Q 20/32* (2013.01); *G06Q 20/3674* (2013.01); *H04B 1/3888* (2013.01); *H04M 1/21* (2013.01); *G06Q 2220/00* (2013.01)

(58) Field of Classification Search
CPC ..................... G06Q 20/401; G06Q 20/3674
See application file for complete search history.

(56) References Cited

U.S. PATENT DOCUMENTS

| 10,269,009 | B1 * | 4/2019 | Winklevoss | G06Q 20/105 |
| 2021/0357914 | A1 * | 11/2021 | Silvestri | H04L 9/0825 |
| 2024/0171385 | A1 * | 5/2024 | Gagne-Keats | H04L 9/0877 |

FOREIGN PATENT DOCUMENTS

WO WO-2020172134 A1 * 8/2020

OTHER PUBLICATIONS

,Strategy Orientation Analysis in the Mobile Phone Case Business, Isoherranen, Ville, Modern economy, Jan. 2011, vol. 2 (3), p. 395-402.*

* cited by examiner

*Primary Examiner* — Ilse I Immanuel
(74) *Attorney, Agent, or Firm* — Plumsea Law Group, LLC

(57) ABSTRACT

A phone case includes a cold wallet that holds various cryptocurrencies. A method provides for operation of a smartphone placed in the phone case to interact with the cold wallet. The cold wallet can be incorporated into a system that includes secure storage, a battery, and communications hardware. The system has robust security features, including features that require surface to surface proximity. For example, the system may use wireless charging, which only operates with a limited range. The phone case can use the wireless charging system to send and receive authentication signals from the smartphone. Based on the authentication signals the phone case can power up and connect the secure storage to the rest of the system, thereby only providing secured access to the keys in the cold wallet. After use, the system disconnects the secure storage and the powers down to cold wallet, protecting the private keys.

20 Claims, 15 Drawing Sheets

PHONE CASE WITH INTEGRATED COLD WALLET

TECHNICAL FIELD

The present disclosure generally relates to a phone case, and in particular to a phone case with an integrated cold wallet.

BACKGROUND

A cryptocurrency is a digital currency designed to work as a medium of exchange through a computer network. A cryptocurrency is not reliant on any central authority, such as a government or bank, to uphold or maintain it. Individual coin ownership records may be stored in a digital ledger. Such a digital ledger is a computerized database that uses strong cryptography to secure transaction records, to control the creation of additional coins, and to verify the transfer of coin ownership.

Cryptocurrency does not exist in physical form like paper money. Cryptocurrencies typically use decentralized control as opposed to control by a central bank or governmental entity. When a cryptocurrency is minted or created prior to issuance or issued by a single issuer, it is generally considered centralized. When implemented with decentralized control, each cryptocurrency works through distributed ledger technology, typically a blockchain, that serves as a public digital ledger to manage the flow of cryptocurrency. Thus, a cryptocurrency is a tradable digital asset or digital form of money, built on blockchain technology that only exists online. Cryptocurrencies use encryption to authenticate and protect transactions, hence their name.

A cryptocurrency wallet is a device, physical medium, program or a service which stores the public and/or private keys for cryptocurrency transactions. In addition to this basic function of storing the keys, a cryptocurrency wallet also often offers the capability of encrypting and/or signing information. Signing can for example result in executing a smart contract, a cryptocurrency transaction, identification, or legally signing a document.

A cold wallet, also referred to as a hardware wallet or offline wallet, is a special type of bitcoin wallet that stores the user's private keys in a secure hardware device. Cold wallets have major advantages over standard software wallets. In cold wallets, private keys may often be stored in a protected area of a microcontroller. Thus, private keys stored in cold wallets cannot be transferred out of the device in plaintext. Cold wallets are also immune to computer viruses that steal from software wallets, can be used securely and interactively, and private keys never touch potentially-vulnerable software. While a cold wallet may provide secure access to cryptocurrency keys, there may be security issues in using such a cold wallet because the cold wallet employs interaction with an external device to reach the Internet. Additionally, cold wallets may be easily lost, creating a situation where rebuilding the keys is useful.

There is a need in the art for a system and method that addresses the shortcomings discussed above.

SUMMARY

In one aspect, a phone case configured to receive a smartphone includes a cold storage memory module, the cold storage memory module storing at least one private key associated with a cryptocurrency account. The phone case further includes a wireless power module. The phone case further includes a security module coupled to the wireless power module. The security module is configured to receive an activation signal from the smartphone at the wireless power module, sent using wireless charging. The security module is further configured to power up the phone case. The security module is further configured to send a request to the smartphone for authentication credentials. The security module is further configured to receive authentication credentials from the smartphone. The security module is further configured to validate the authentication credentials from the smartphone. In response to the authentication credentials being valid, the security module is configured to form a physical connection between the security module and the cold storage memory module. The security module is further configured to receive a request for a cryptocurrency transaction associated with the cryptocurrency account from the smartphone. The security module is further configured to conduct the cryptocurrency transaction requested by the smartphone using the at least one private key.

In another aspect, a phone case with an integrated cold wallet, configured to conduct cryptocurrency transactions, includes a cold storage memory module, the cold storage memory module storing at least one private key associated with at least one cryptocurrency account. The phone case further includes a wireless power module. The phone case further includes a security module coupled to the wireless power module. The security module is configured to receive an activation signal from the smartphone at the wireless power module, sent using wireless charging, and power up the phone case upon receipt of the activation signal. The security module is further configured to send a request to the smartphone for authentication credentials. The security module is further configured to receive authentication credentials from the smartphone. In response to the authentication credentials being valid, the security module is configured to form a physical connection between the security module and the cold storage memory module. The security module is further configured to receive a request for a cryptocurrency transaction associated with a cryptocurrency account selected from the at least one cryptocurrency account from the smartphone. The security module is further configured to confirm parameters of the cryptocurrency transaction using a connection between the security module and the smartphone. In response to the parameters of the cryptocurrency transaction being confirmed, the security module is further configured to conduct the cryptocurrency transaction requested by the smartphone.

In another aspect, a method performed by a smartphone configured to interact with a phone case includes sending a wireless power activation signal to activate the phone case. The method further includes receiving a request for authentication information from the phone case. The method further includes sending the authentication information to the phone case to access a cold wallet provided by the phone case. The method further includes, in response to the authentication information being valid, conducting a cryptocurrency transaction using the cold wallet. The cryptocurrency transaction is conducted when the smartphone is installed in the phone case and the phone case is activated.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The embodiments provide a phone case and methods for using such a phone case as a phone case with an integrated cold wallet. The phone case includes provisions to provide a cold wallet that would hold various private keys corresponding to accounts for various cryptocurrencies. These provisions can be incorporated into a system that includes secure storage, a battery and communications hardware. The overall system has robust security features including features that use surface to surface proximity. In addition to existing security protocols in smartphones, like passcodes and biometrics, this system includes security features that surface to surface proximity in order to work. One example may be wireless charging. Such surface to surface proximity may ensure that the cold wallet is only usable when a smartphone associated with appropriate access privileges is installed in the phone case. While examples are presented based on using a smartphone, it may be recognized that other types of mobile devices such as tablets and other devices that may use wireless charging hardware to interact with a case may also be used in other embodiments.

The phone case may use the wireless charging system to send and receive authentication signals from the smartphone. Based on these authentication signals, the cold wallet may power up and connect the secure storage including a cold wallet to a security module, which would then have access to the private keys of cold wallet for cryptocurrency transactions. After use, the security module of the cold wallet would disconnect the secure storage and power down the cold wallet. The cold wallet stores private keys, and may be able to use the private keys for cryptocurrency transactions such as checking a fund balance, sending cryptocurrency, and receiving cryptocurrency.

Some embodiments place restrictions on when the cold wallet may be active and how the cold wallet interacts with a smartphone. Accordingly, it may be possible to avoid some of the security measures that may otherwise be used when using a cold wallet. For example, it may be only possible to access the private keys through the security module. Further, the security module can only interact with the private keys once the cold wallet is active and the smartphone provides credentials. Such credentials may include hardware-based and software-based credentials. These credentials may establish that a user may have access to at least one private key in the cold wallet. Such a private key may be associated with a cryptocurrency account on the blockchain.

Figure 1:
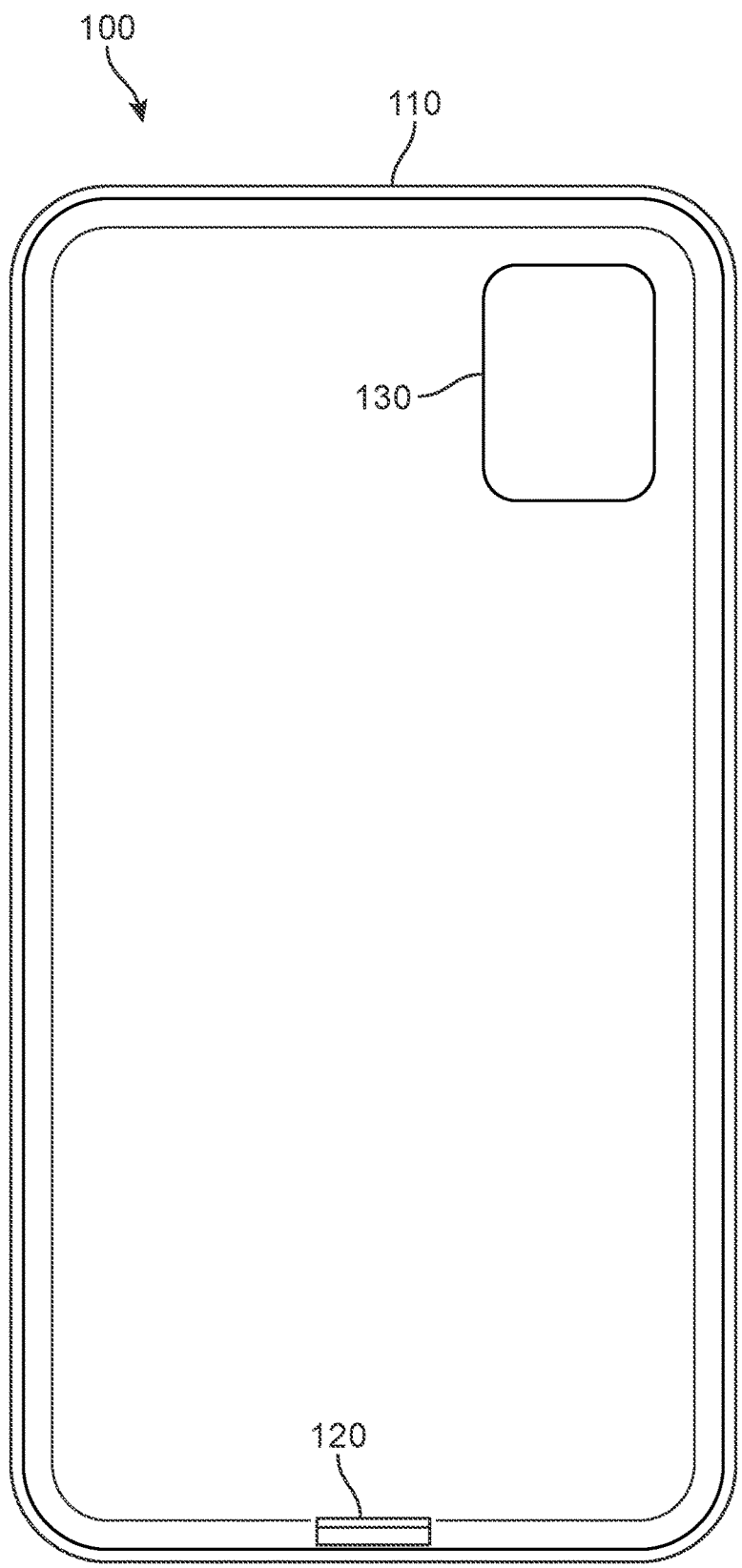
FIG. 1 is a schematic view of a front view of a phone case, according to an embodiment.

FIG. 1 is a schematic view of a front view 100 of a phone case, according to an embodiment. For example, phone case 110 provides a case into which a smartphone may be inserted. One role of phone case 110 may be to protect the smartphone from various damage. For example, the phone case 110 may protect the phone from water damage, drop damage, screen cracking, wear and tear, and so on. The phone case 110 may also make the phone more comfortable to hold. In FIG. 1, phone case 110 includes a margin area. The margin area may cover or wraps around the bezel of a smartphone once the smartphone is introduced into phone case 110.

FIG. 1 also illustrates charging aperture 120 and camera hole 130. Charging aperture 120 may be a gap in phone case 110 that allows a user to introduce a cable into the phone, thereby charging the phone using wired power. For example, such a cable may be a USB cable (such as mini-USB, micro-USB, or USB C), a Lightning serial cable, or the like. The charging port may also allow for sharing data, such as if the phone is connected to a laptop or desktop computer. The charging aperture 120 may also allow other devices to connect to the smartphone, such as memory devices, memory chip readers, input devices (game controllers, keyboards, mice, etc.) and output devices. Camera hole 130 provides an uncovered region on the rear side of the phone case 110. Thus, camera hole 130 allows cameras of the smartphone to take pictures using one or more cameras on a rear of the smartphone.

Phone case 110 may optionally include apertures or other modifications to allow a user access to buttons on the side of the smartphone. The buttons may include at least one of a power button, volume control buttons, a digital assistant button, and a programmable button. The apertures may also permit access to ports, such as a headphone jack or video output port. Phone case 110 may be formed of a flexible material such as rubber or a soft plastic. Using such materials helps allow easy introduction of the smartphone into and removal from the phone case 110.

Figure 2:
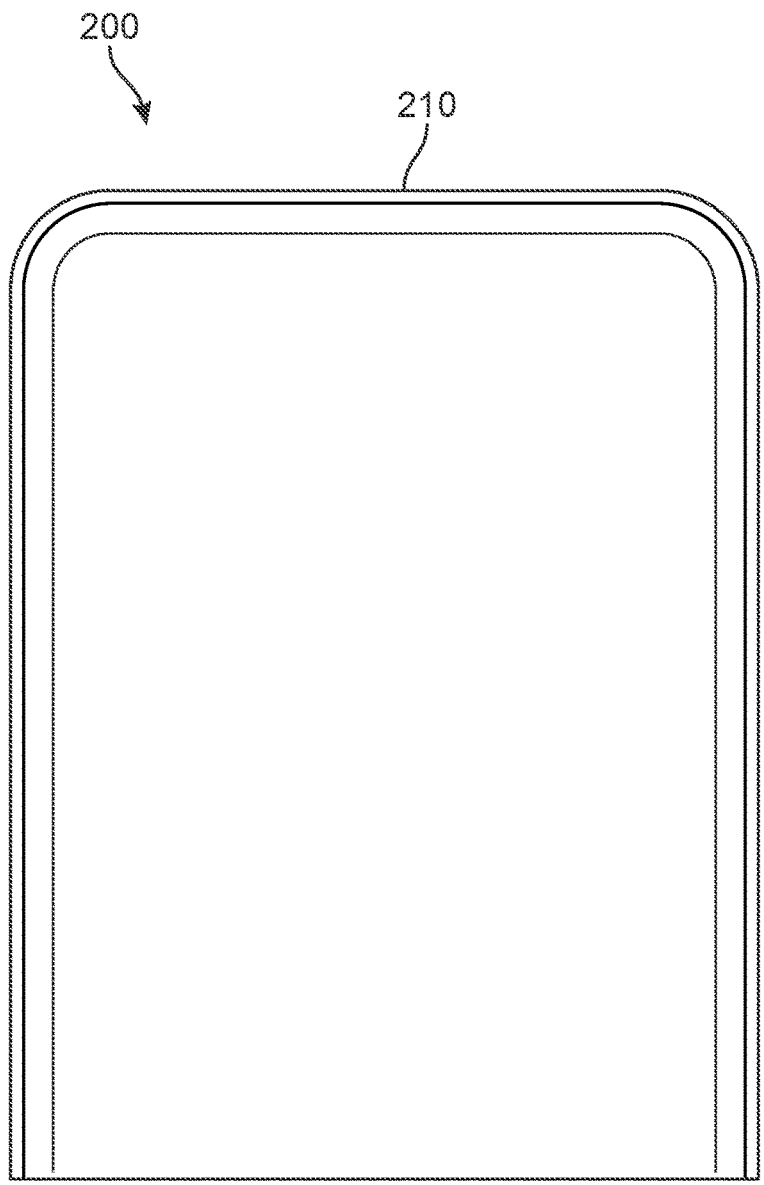
FIG. 2 is a schematic view of a front view of a phone case, according to another embodiment.
Figure 2:
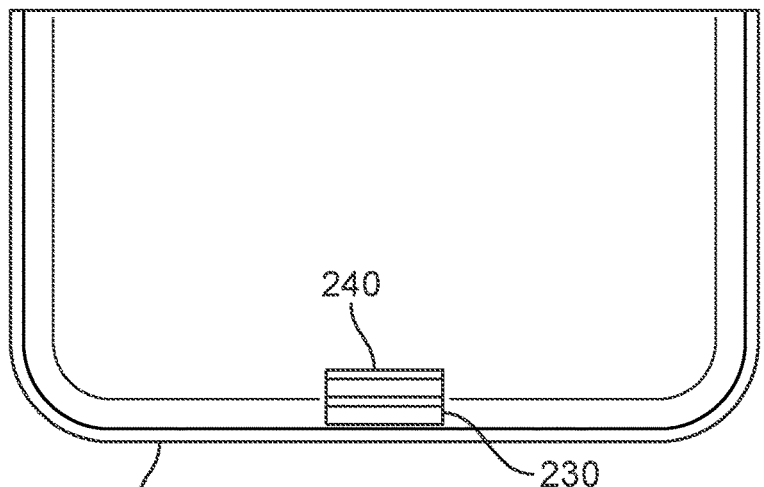

FIG. 2 is a schematic view of a front view 200 of a phone case, according to another embodiment. In FIG. 2, the phone case includes an upper portion 210 and a lower portion 220. In the example of FIG. 2, the upper portion 210 and the lower portion 220 may be slid onto the phone separately. Because of this alternative structure and use case, the approach of using separate upper portion 210 and lower portion 220 may be more suitable for a phone case that uses harder or less flexible materials. Examples include a harder plastic or another hard material. However, these are only non-limiting examples. Materials for phone cases may also include rugged and resistant aluminum, carbon fiber, silicon, and steel; synthetics such as neoprene, plastic, polyurethane and TPU; and more specialized materials such as bamboo, felt, leather, and animal skin, as additional non-limiting examples.

FIG. 2 also illustrates a variant of how the case may be configured, in that there may be a charging aperture 230 and a charging connector 240. In the example of FIG. 2, instead of having an aperture that allows direct connection between the smartphone and an outside cable or device, the charging aperture 230 allows a cable to connect to the lower portion 220 of the case, and the case includes the charging connector 240, such that a smartphone not only fits into the case physically, but also electrically connects to the case through introducing charging connector 240 into a charging port of the smartphone.

Figure 3:
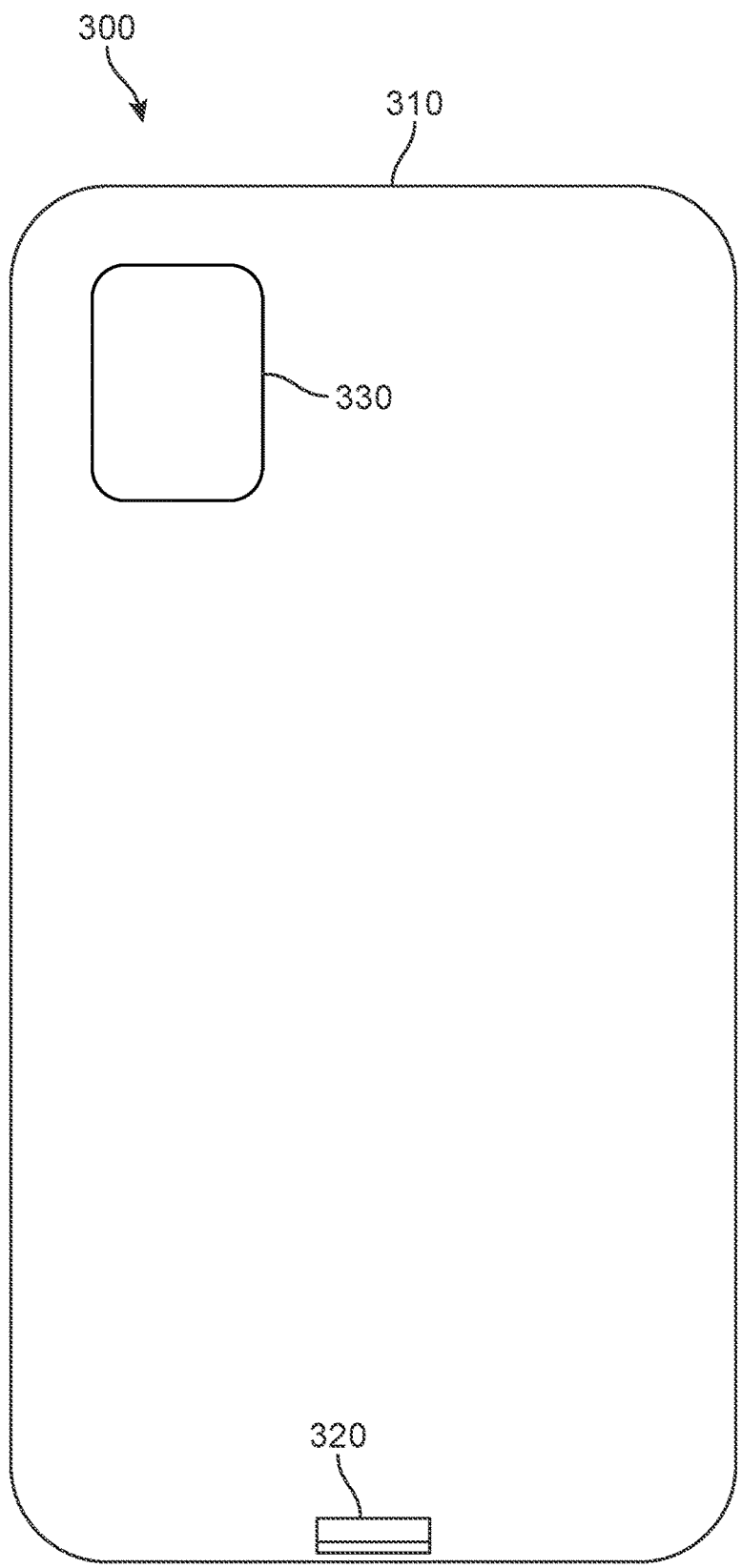
FIG. 3 is a schematic view of a rear view of a phone case, according to an embodiment.

FIG. 3 is a schematic view of a rear view 300 of a phone case, according to an embodiment. Phone case 310 shows edges that surround or overlap with a smartphone once the smartphone is introduced into phone case 310. FIG. 3 also shows certain features presented in FIG. 1. However, these features are moved based on viewing from the rear view of the phone case 310. Thus, camera hole 330 is on the other side of the phone case 310. For example, phone case 310 is shown as having a charging aperture 320 corresponding to charging aperture 120. Phone case 310 is also shown as having a camera hole 330 corresponding to camera hole 130. However, as in FIG. 1, these may only be example locations and shapes for charging aperture 320 and camera hole 330. These elements may also be located on different portions of phone case 310, or may have different shapes. FIG. 3 shows a rear view of a one piece phone case as shown in FIG. 1. The rear view of a two-piece phone case as shown in FIG. 2 may have a similar rear view, with appropriate modifications.

Figure 4:
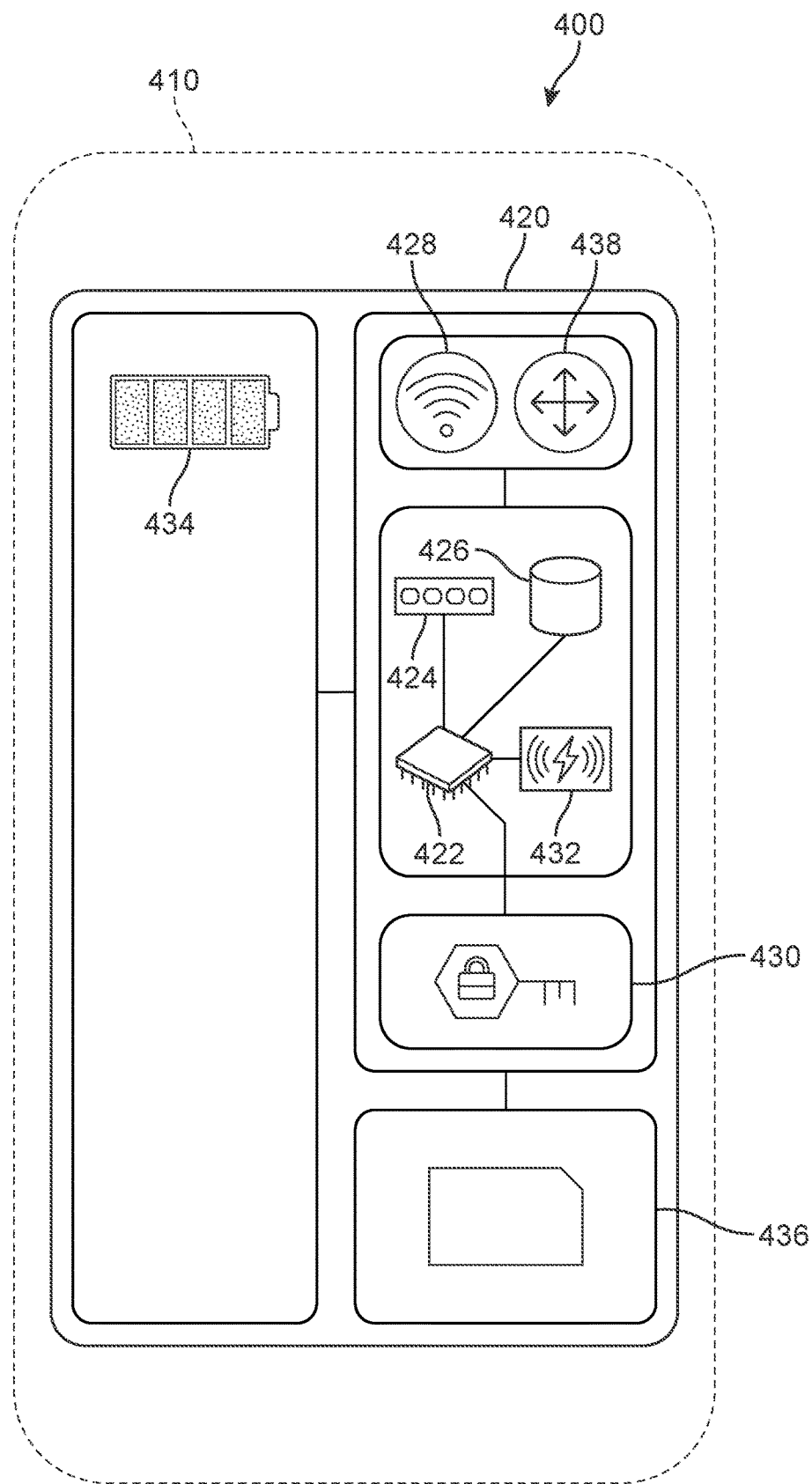
FIG. 4 is a schematic view of a cutaway of internal circuitry embedded in a phone case, according to an embodiment.

FIG. 4 is a schematic view 400 of a cutaway of internal circuitry embedded in a phone case, according to an embodiment. FIG. 4 shows a phone case 410 that corresponds to the phone cases shown in FIGS. 1-3. The phone case 410 of FIG. 4 also includes, embedded in the phone case 410, a printed circuit board 420. The printed circuit board 420 includes various electronic components. For example, the circuit board 420 may include, as non-limiting examples, a processor 422, a memory 424, a storage 426, a wireless communication module 428, a security module 430, a wireless power module 432, a battery 434, and a memory card 436.

Processor 422 and memory 424 are each illustrated as being a single unit in FIG. 4. However, processor 422 may include multiple processors or processors with multiple cores. Memory 424 may also take on different forms and may include multiple memory 424 elements. Memory 424 may store information about what credentials may be used for a user to be entitled to access the cold wallet. Storage 426 stores information used by processor 422 and memory 424 in a persistent form. For example, storage 426 may store additional information about what credentials may be used for a user to be entitled to access the cold wallet. Wireless communication module 428 allows the phone case 410 to communicate wirelessly with the smartphone once the cold wallet is activated. Security module 430 has two main functions. Security module 430 makes a determination whether a user may be entitled to access all or some of the cryptographic keys used to access cryptocurrency used by the cold wallet. Security module 430 may be designed to then access the keys securely, and to use the keys appropriately when instructed to do so by a user with the correct credentials.

Wireless power module 432 interacts with the smartphone by sending and receiving power with the smartphone to determine when to activate or wake up the case. Battery 434 provides a power source for the case. In general, such a battery 434 will be a rechargeable battery. but it may also be possible to use a non-rechargeable battery that may be replaced when it runs out of energy, or to receive power for the case from the phone itself. Memory card 436 may store information for security module 430. Specifically, memory card 436 may store additional credentials corresponding to a user or users who may wish to access cryptocurrency accounts using private keys. Such credentials may help ensure that credentials based on information stored in memory 424 or storage 426 are fully valid. Memory card 436 stores the private keys themselves. Memory card 436 may only be accessible once the phone case 410 is active and once the security module 430 has established an initial connection with the memory card 436. This approach helps secure the private keys.

Thus, while FIG. 4 shows security module 430 as being in direct contact with the memory card 436, such contact may only be permitted when the phone case 410 is activated and the user's credentials have been verified. Moreover, the direct contact between security module 430 and the memory card 436 may be managed in this manner to achieve the security and integrity of the private keys. Direct knowledge of the private keys would provide unfettered access to the associated cryptocurrency. Thus, restricting access in this manner protects the security of the private keys. Protecting the private keys thus protects the security of the cryptocurrency accounts associated with the cold wallet itself. However, the cold wallet itself does not have any Internet connectivity. Hence, the cold wallet may communicate with the smartphone as described below. The smartphone may be an intermediary that has internet connectivity and sends data back and forth between the Internet and the cold wallet. The interaction between the smartphone and the cold wallet includes certain safeguards to ensure that the smartphone may be only interacting with the cold wallet in appropriate ways.

Some embodiments may include provisions for ensuring that keys in the cold wallet may be secure. In some embodiments, the private keys in particular may be secured. In some cases, the private keys may be stored so that they can only be accessed using a security module. In some embodiments, the private keys may be stored in a secure memory card. In some cases, the secure memory card may be preprogrammed and may be fixed within the phone case. In some embodiments, the memory card may be programmable. In some cases, the memory card may be removable. In some embodiments, the memory card may be a microSD card, an SD card, a Compact Flash card, a Memory Stick card, or another type of memory card. In some cases, the memory may be another form of memory, such as a hard drive or another medium.

In some cases, the private keys may only be accessible when the cold wallet is turned on. In some embodiments, the private keys may be encrypted, adding another aspect of protection. In some cases, the private keys use access credentials to be used. In some embodiments, such credentials may include biometric credentials. In some cases, biometric credentials may include a fingerprint scan, a retinal scan, facial recognition, and so on. In some cases, such credentials may include a username and password. In some embodiments, such credentials may include a personal identification number (PIN).

In some embodiments, the credentials may include hardware credentials. In some cases, the hardware credentials may include an International Mobile Equipment Identity (IMEI) number identifying the smartphone or information from a Subscriber Identity Module or Subscriber Identification Module (SIM) card or chip embedded in the smartphone. Validating such credentials may help confirm that only an authorized user can access cryptocurrency associated with the cold wallet.

Figure 5:
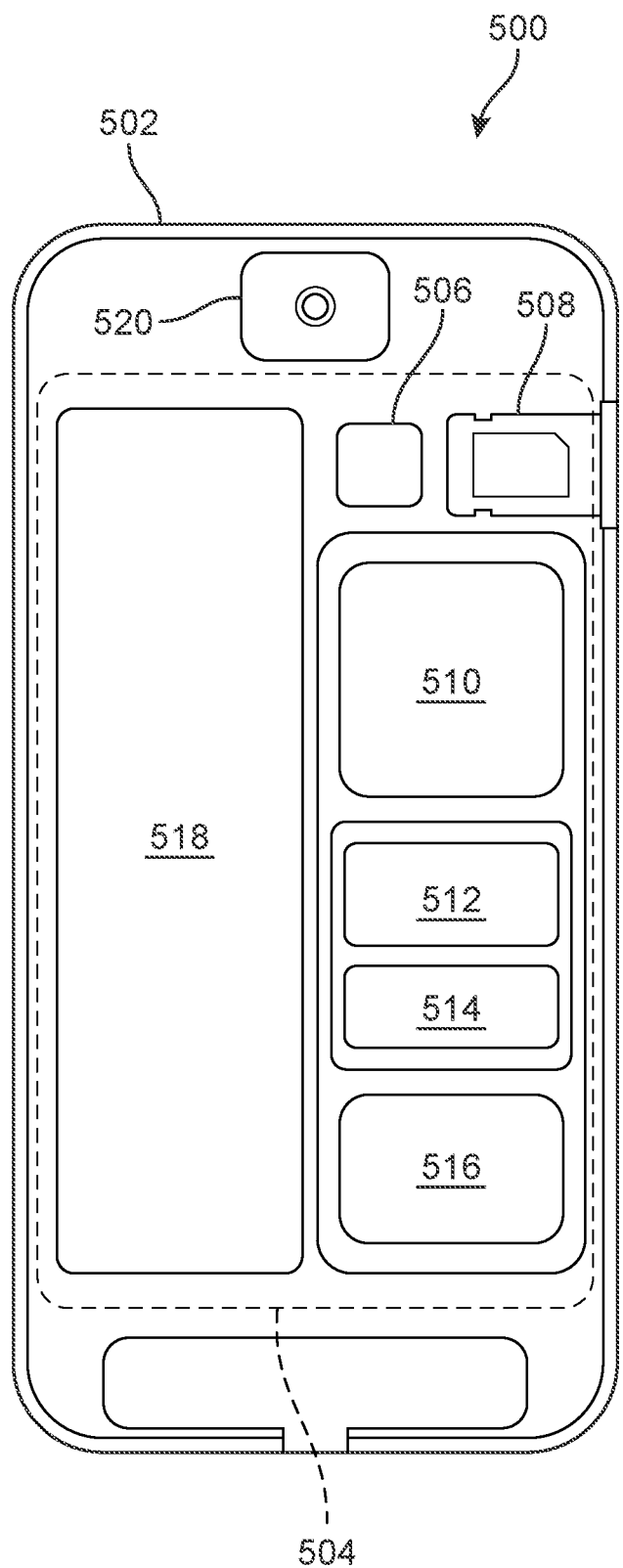
FIG. 5 is a schematic view of a smartphone, according to an embodiment.

In some embodiments, other information derived from the hardware of a smartphone introduced into a phone case may be used to establish that the smartphone may be entitled to access the cold wallet. In some cases, information establishing proximity between the smartphone and the cold wallet may be used to provide access to the cold wallet. In some embodiments, the credentials may include two-factor authentication, or even three or more forms of authentication. By using these combinations of credentials, once the cold wallet in the phone case is powered on, access to the private keys may be restricted FIG. 5 is a schematic view 500 of a smartphone, according to an embodiment. FIG. 5 is a schematic diagram 500 of a smartphone 502 showing components that may be used in the interaction with a cold wallet in an embodiment. While smartphone 502 is generally assumed to be a smartphone, other appropriate mobile devices such as a tablet or a phablet may be used instead of a smartphone as smartphone 502 in other embodiments. Smartphone 502 includes a display 504. Display 504 may display information about interactions with cryptocurrency accounts provided by the cold wallet to a user of smartphone 502 when interaction with such a cold wallet may be activated and subsequently utilized.

The interaction may also facilitate the provision of credentials and otherwise establish access by a user to the user's crypto currency in a safe manner. Display 504 also acts as a user interface that a user of smartphone 502 may use to perform cryptocurrency transactions once the user has established credential. In some embodiments, smartphone 502 can allow a user to establish that a given user may be allowed to have access to certain cryptocurrency, but not other cryptocurrency. The access may be based on credentials that provide indications that certain users should access specified private keys. Those private keys may then be associated with amounts of various cryptocurrencies. For example, one user may have access to an account with access to some Bitcoin and some Ethereum. Another user may have access to an account with access to some Bitcoin and some Ripple.

Smartphone 502 additionally includes a GPS unit 506. Data obtained from this GPS unit 506 allows smartphone 502 to report its location to confirm that it may be in a suitable location to access cryptocurrency. For example, smartphone 502 may verify the location of the smartphone 502 using the GPS unit 506. The smartphone 502 may be restricted to accessing cryptocurrency at certain locations. Such a restriction may help preserve the security of cryptocurrency, so that transactions can only occur when the smartphone 502 may be in a safe location. Smartphone 502 may also include a subscriber identity module (SIM) 508. In some embodiments, SIM 508 may serve to authenticate smartphone 502 with the phone case as part of the hardware credentials. Using the SIM may be helpful in establishing the legitimacy of a cryptocurrency transaction the smartphone 502 wishes to perform in an interaction with the phone case.

Smartphone 502 may also include a processing unit 510 that acts as a control module for the components of smartphone 502, including display 504 and camera 520. In some embodiments in which smartphone 502 provides instructions to power on and then interact with the phone case, processing unit 510 may also direct the cryptocurrency interactions. In other embodiments, processing unit 510 merely acts a control module for a separate cryptocurrency control module present on smartphone 502. In other embodiments, some or all of the cryptocurrency control module may be remote (such as being a part of the phone case, such as control module 430). In such embodiments, smartphone 502 may display information about the cryptocurrency accounts received from the cryptocurrency control module. Further, in such embodiments, processing unit 510 in smartphone 502 may receive communications from the cryptocurrency control module so that smartphone 502 may be notified of a cryptocurrency account's balance or may have access to information about transactions.

The communication directed by the processing unit 510 may also provide a user interface, shown using display 504, that allows smartphone 502 to initiate cryptocurrency transactions. Such cryptocurrency transactions may include transactions where the cold wallet provides an associated wallet address or public key so that another user may send cryptocurrency for receipt by the cold wallet. Cryptocurrency transactions may also include transactions where the cold wallet receives a wallet address or public key as well as information about how much cryptocurrency of a given type or types to send to a recipient and any necessary transaction fee or fees.

Smartphone 502 may also include a connection module 516. Connection module 516 may be associated with a wired connection to smartphone 502. For example, the wired connection may be used for charging smartphone 502. The wired connection may also be used for making a wired data connection between smartphone 502 and another device. In some embodiments, such a wired connection between smartphone 502 and the phone case may be preferred for increased efficiency and speed of interaction between smartphone 502 and the phone case. The initial powering on of the phone case may occur by use of a wireless power module 620, as discussed with respect to FIG. 6. However, connection module 516 may serve to send authentication (both hardware and software) information to the cold wallet. In some embodiments, connection module 516 also serves as a communications path for updating firmware or uploading security data into a security module installed on smartphone 502.

Smartphone 502 further includes a memory 514. In some embodiments, memory 514 stores information about accessing cryptocurrency accounts accessible through the cold wallet. In some embodiments, memory 514 may also serve as local storage for information used for a user interface. For example, memory 514 may store software for managing cryptocurrency associated with smartphone 502, providing a user interface for the user of the smartphone 502 to manage the user's cryptocurrency portfolio.

Smartphone 502 may also include a communication module 512. Communication module 512 may be associated with wireless communications (such as Wi-Fi, Bluetooth, Near-Field Communication (NFC) technologies, and cellular communications of various types for transmissions over the Internet). Such interactions may occur with other devices, servers, and databases proximate to the smartphone 502. In some embodiments, communication module 512 thus allows smartphone 502 to wirelessly send and receive information about cryptocurrency transactions to and from the security module of the cold wallet.

Communication module 512 may send and receive information to and from the cold wallet, providing software and hardware authentication information. Communication module 512 may also provide the smartphone 502 with a connection to the Internet. The smartphone 502 can relay information to and from the Internet, which may be necessary for the cold wallet to be able to interact with the blockchain. Without such access, the cold wallet cannot perform any transactions. Simply having the private keys in cold storage may not be sufficient to perform transactions. Instead the private keys may interact with the blockchain to determine a cryptocurrency balance or to introduce a transaction into the blockchain.

Smartphone 502 also includes a battery 518 and a camera 520. Battery 518 may provide a power source for smartphone 502. In some embodiments, camera 520 takes images of the user to be analyzed using facial recognition or other biometric information as a credential to help ensure that only a legitimate user may be able to access a cryptocurrency wallet associated with private keys stored in the phone case.

Figure 6:
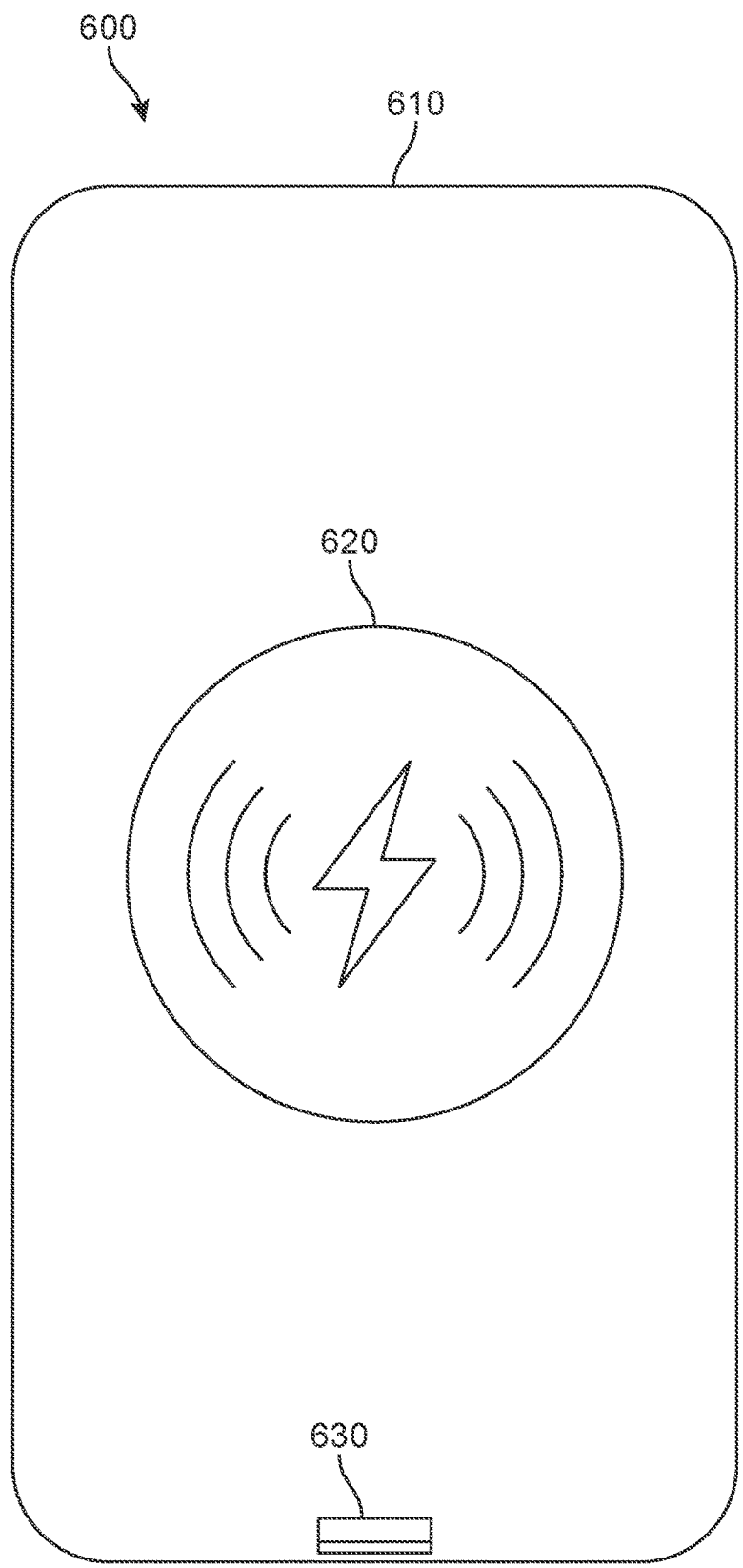
FIG. 6 is a rear view of a smartphone, according to an embodiment.

FIG. 6 is a rear view 600 of a smartphone, according to an embodiment. Smartphone 610 includes a wireless charging component 620. Wireless charging component 620 can send and receive wireless power using magnetic resonance. For example, a particular type of wireless power that may be used by wireless charging component 620 may be Qi charging. The Qi standard is an open interface standard that defines wireless power transfer using inductive charging over distances up to 4 cm. The system uses a charging pad and a compatible device, which may be placed on top of the pad, charging via resonant inductive coupling. However, Qi charging is only any example and other forms of wireless charging such as Power Matters Alliance (PMA) charging may be used in other embodiments. Thus, while the wireless charging is referred to as Qi charging by way of example in this disclosure, this is not to be taken as limiting.

Also, in embodiments, the wireless power (which may be Qi charging) may not be limited to transmitting power, but may also serve as a carrier for data. The wireless charging component 620 may activate the cold wallet in the phone case. Once the cold wallet is active, the wireless charging component 620 may control the exchange of information between the smartphone 610 and the phone case. Specifically, the wireless charging component 620 may provide credentials to the security module of phone case to initiate access to the transactions associated with the cold wallet. The wireless charging component 620 may subsequently help manage such transactions. Charging port 630 may be a portion of smartphone 610 that allows the smartphone 610 to receive wired power or to connect to external devices. Such a connection is elaborated upon elsewhere in the present disclosure.

Figure 7:
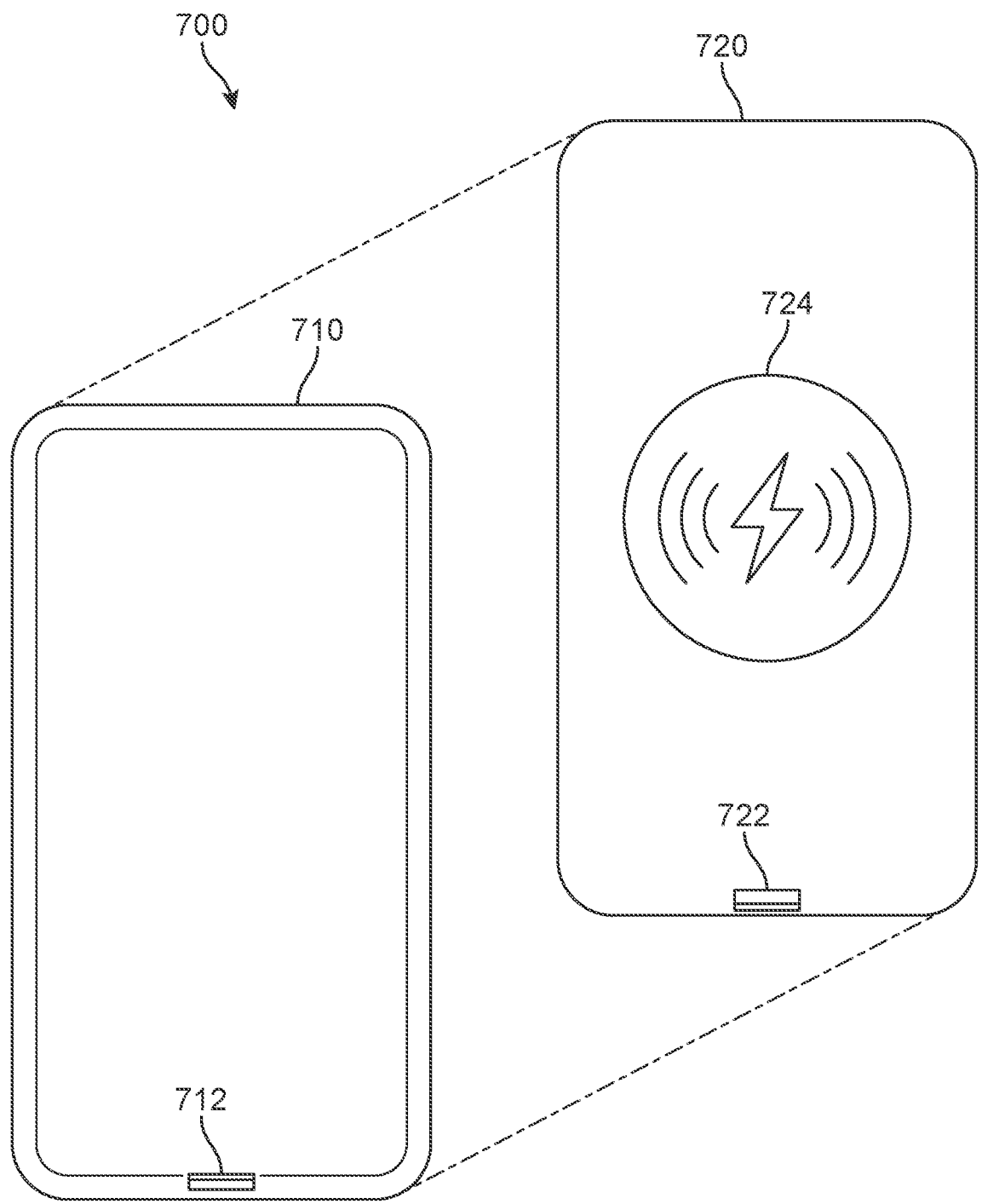
FIG. 7 is a schematic view of introduction of a smartphone into a phone case, according to an embodiment.

FIG. 7 is a schematic view 700 of introduction of a smartphone into a phone case, according to an embodiment. Smartphone 710 slides into phone case 720. FIG. 7 corresponds to FIG. 1, in that phone case 720 may be flexible enough to allow smartphone 710 to fit into the phone case 720. It may also be possible to use an approach similar to that of FIG. 2, where phone case 720 includes multiple portions that slide onto smartphone 710. In FIG. 7, smartphone 710 includes charging port 712 which may be paired with charging port aperture 722 of the phone case 720. FIG. 7 also shows a wireless power module 724.

Some embodiments may include provisions for activating a cold wallet. In some embodiments, such activating may be an initial powering-on that may be followed by a provision of credentials to actually use the cold wallet. In some embodiments, the cold wallet activates the cold wallet when the smartphone may be placed in the phone case. In some cases, the cold wallet activates when the smartphone may be in direct physical contact with the phone case. In some embodiments, the cold wallet may activate when the smartphone may not be in direct physical contact with the phone case, but may be instead extremely close (such as within a couple of millimeters), which may indicate that the smartphone may be in the process of being put into the phone case. However, in such embodiments, when the cold wallet begins to activate when the smartphone may be close to the phone case, the cold wallet may deactivate if the smartphone may not be subsequently placed into direct physical contact with the phone case or fully installed into the phone case. In some cases, the smartphone may signal that it detects a phone case in direct physical contact or close proximity by activating the cold wallet using a wireless charging signal.

In some embodiments, a protocol such as Qi charging may be used for sending the wireless charging signal. In some cases, another protocol such as PMA charging may be used for sending the wireless charging signal. In some embodiments, the signal sent may be a particular wake-up signal sent from the smartphone to the phone case, such that the wake-up signal may be received at the phone case. Such a wake-up signal initiates a wake-up and powering on of the phone case hardware. The phone case may be subsequently able to initiate operations of the cold wallet integrated in the cold wallet. In some cases, the cold wallet that may be a part of the phone case may only be able to be powered on in response to receiving the wireless charging signal from the smartphone. In some embodiments, it may be possible to turn the cold wallet may be turned on using another approach, such as a button or switch. However, even if another control may be used as part of turning on the cold wallet, a wireless power interaction with the smartphone may be a part of fully activating the cold wallet.

Wireless power transmission using such a wireless power module 724, which may include Qi charging, has a very short range. For example, the Qi standard provides that wireless charging has a range of up to 40 mm (or 4 cm). However, in some embodiments, with wireless charging, the device sending the wireless power and the device receiving the wireless power will either be in direct physical contact with one another, or will only be separated by 1-2 millimeters. If smartphone 710 may be placed inside of the phone case 720, this distance expectation may be satisfied. In these cases, the wireless power module 620 of the smartphone 710 may either be in direct physical contact with wireless power module 724 or in near-direct physical contact (i.e., 1-3 millimeters of separation) with the corresponding wireless power module 724 of the phone case 720. Such a level of proximity may be sufficient to provide for successful wireless power interaction between the smartphone 710 and the phone case 720.

It may also be possible for the wireless power interaction to allow the phone case 720 to supply the smartphone 710 with energy. The wireless power interaction may provide operational energy or charge the battery 518 of the smartphone. Such energy may originate as energy from the battery 434 of the phone case, or an external wired power source connected to the phone case 720, such as through a phone plug of the phone case 722. There may also be a wired connection between the smartphone 710 and the phone case 720 between power aperture 712 of the smartphone 710 and the phone plug of the phone case 722.

However, a primary purpose of the interaction between the smartphone 710 and the phone case 720 using wireless power may be to activate a cold wallet in the phone case 720. Such a phone case 720 cannot be activated without receiving a particular data signal embedded in a wireless transmission. Only after the phone case 720 may be activated, a user can then establish an identity using credentials provided by the smartphone 710 to the phone case 720. Specifically, once the phone case 720 may be activated, then and only then its security module 430 can authenticate a user using credentials to form a connection with the memory card 436 to use the private keys stored on the memory card 436 as the basis for cryptocurrency transactions and balance requests.

Figure 8:
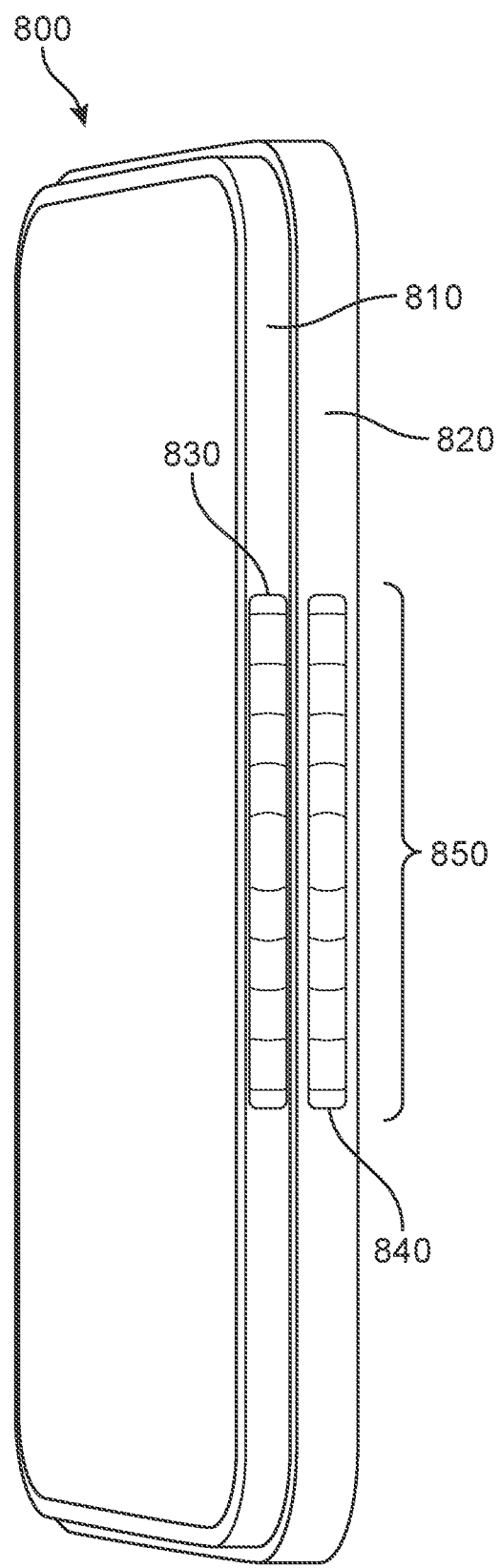
FIG. 8 is a schematic view of a magnetic resonance interaction between a smartphone and a phone case, according to an embodiment.

FIG. 8 is a schematic view 800 of a magnetic resonance interaction between a smartphone and a phone case, according to an embodiment. For example, FIG. 8 shows a tilted front view of smartphone 810 that has been placed into phone case 820. As shown in FIG. 8, phone case 820 surrounds the front display of smartphone 810. The phone case 820 may cover a portion of the bezel of the front display of smartphone 810. FIG. 8 also shows that smartphone 810 includes a magnetic resonance module 830 including electrical coils. The electrical coils of magnetic resonance module 830 may be capable of magnetic resonance to send and receive wireless power using magnetic induction. Likewise, the phone case 820 includes magnetic resonance module 840 with similar coils. The magnetic resonance module 830 of smartphone 810 and the magnetic resonance module 840 of phone case 820 use magnetic resonance 850 to send and receive wireless power, specifically using inductive charging.

In addition to exchanging power, the magnetic resonance signals can act as a carrier for data. Thus, as magnetic resonance module 830 of smartphone 810 transmits power for receipt by the phone case 820 at magnetic resonance module 840, the power signal includes embedded data. Conversely, as magnetic resonance module 840 of phone case 820 transmits for power for receipt by the smartphone 810 at magnetic resonance module 830, the power signal also includes embedded data. Such embedded data may include signals used to wake up the cold wallet embedded in the phone case 820. Also, once the cold wallet embedded in the phone case 820 may be active, the smartphone 810 and the phone case 820 may wish to exchange information. For example, the smartphone 810 can provide the phone case 820 with authentication credentials and so that the phone case 820 can provide the requisite moderated use of public and private keys so that the smartphone 810 can access cryptocurrency associated with the cold wallet embedded in the phone case 820.

Figure 9:
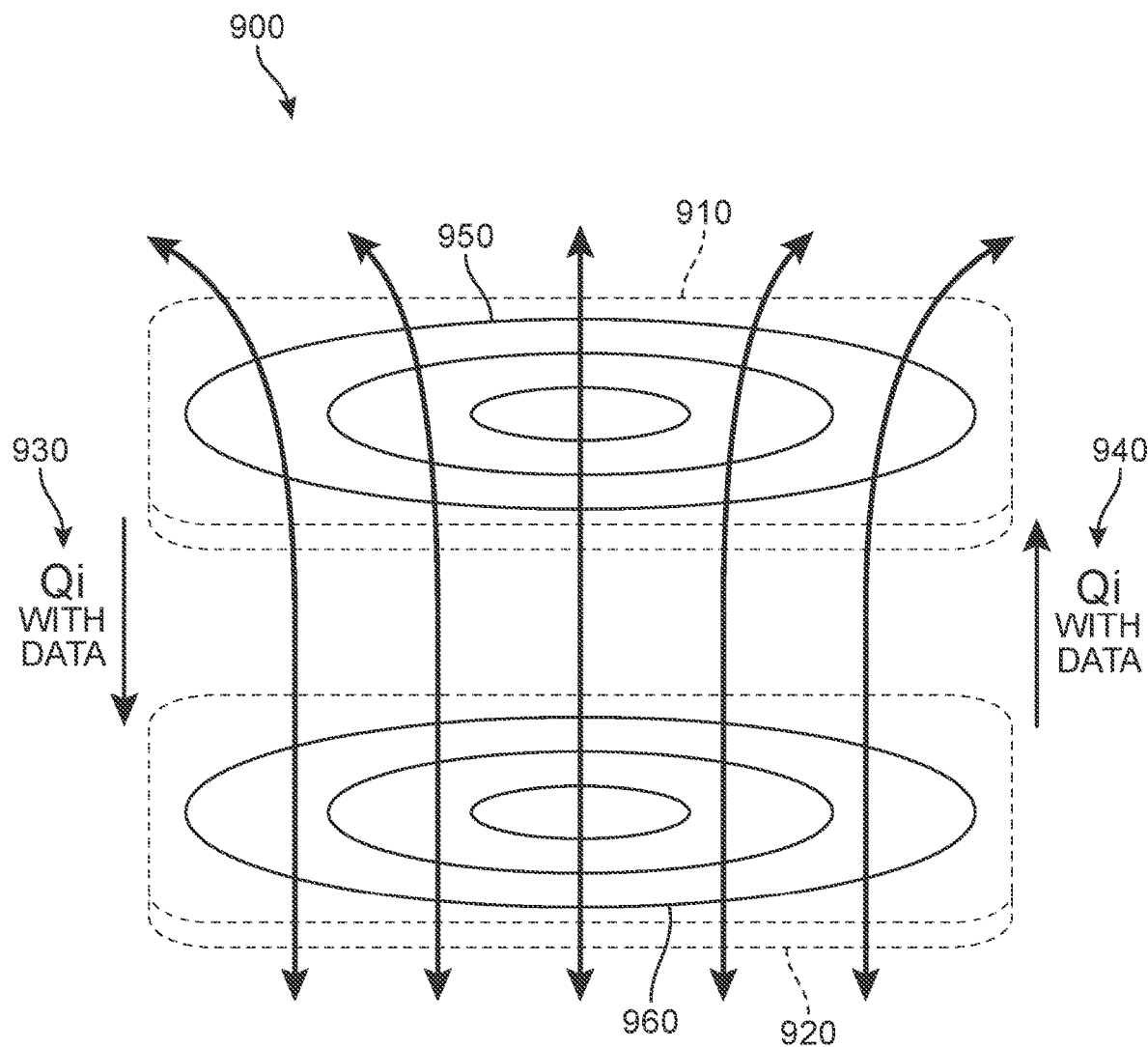
FIG. 9 is another schematic view of a magnetic resonance interaction between a smartphone and a phone case, according to an embodiment.

FIG. 9 is another schematic view 900 of a magnetic resonance interaction between a smartphone and a phone case, according to an embodiment. FIG. 9 shows smartphone 910 and phone case 920 exchanging wireless power signals with one another using inductive charging. Inductive charging operates using inductive coupling. Alternating current passes through an induction coil in one of the smartphone 910 and the phone case 920. The moving electric charge creates a magnetic field. The magnetic field fluctuates in strength because the amplitude of the electric current may fluctuate. The changing magnetic field creates an alternating electric current in the other device's induction coil, which in turn passes through a rectifier to convert the alternating current to direct current. The direct current charges a battery or provides operating power. A special type of inductive charging that may operate over greater distances may be resonant inductive coupling, which may incorporate capacitors to create circuits with associated resonance frequencies. However, the wireless charging is not limited to sharing energy, but may also share information.

While FIG. 9 shows a separation between smartphone 910 and phone case 920 for ease of illustration, in some other embodiments the smartphone 910 and the phone case 920 may be in direct physical contact. Indeed, requiring direct physical contact improves the security of embodiments. However, it may be possible for wireless power transmission to operate at a distance of as many as 40 mm. By using wireless power transmission, the smartphone 910 sends wireless power (such as Qi wireless power) with data included 930 from coils 950 to coils 960. Likewise, using wireless power transmission, the phone case 920 sends Qi wireless power with data included 940 from coils 960 to coils 950. Coils 950 and coils 960 may be metallic wires in the form of concentric circles (or spirals).

As electricity flows through coils 950 and coils 960, the electricity generates a corresponding magnetic field which causes electricity to flow in the corresponding coils on the other device. The magnetic field takes the form of flux lines 970 that flow between coils 950 and 960 and fluctuate in strength as the electricity flows from the smartphone 910 or the phone case 920. Thus, FIG. 9 shows that the wireless power may convey information as well as an actual supply of power. Such information activates the cold wallet contained in the phone case 920 and subsequently allows the smartphone 910 to interact with the phone case 920 to use the activated cold wallet.

Figure 10:
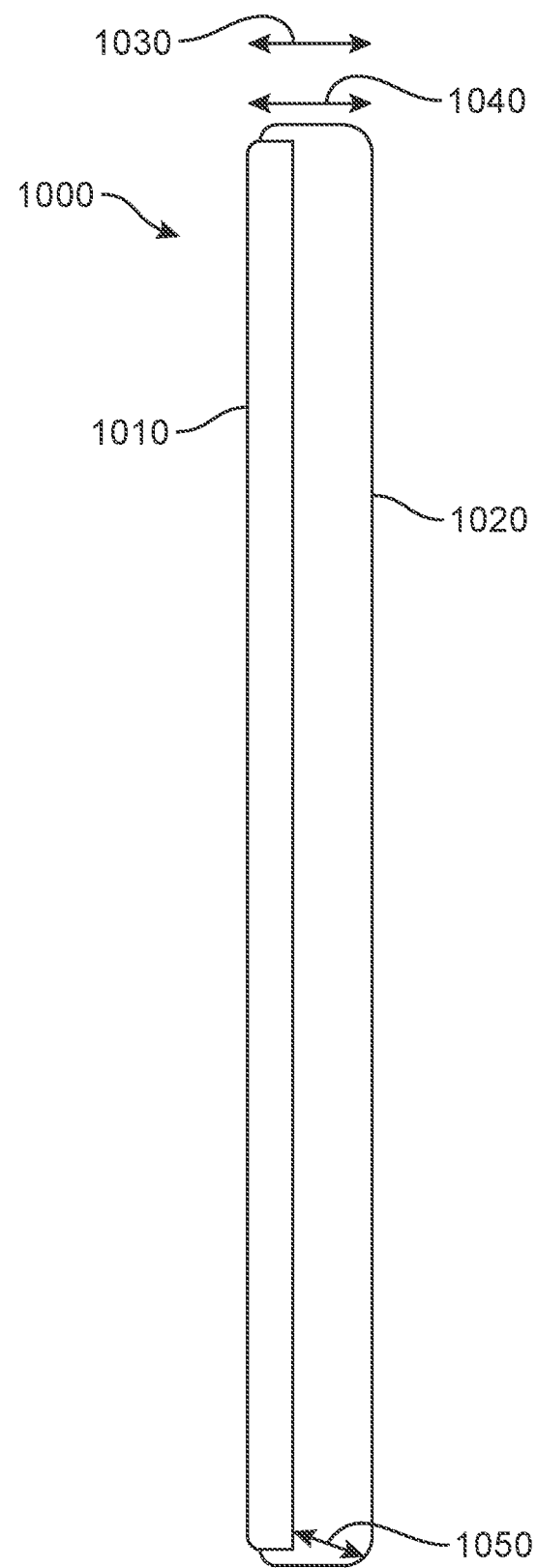
FIG. 10 is a view of an interaction between a smartphone and a phone case while the smartphone is in the phone case, according to an embodiment.

FIG. 10 is a view 1000 of an interaction between a smartphone and a phone case while the smartphone is in the phone case, according to an embodiment. FIG. 10 shows a side view of smartphone 1010 and phone case 1020. Smartphone 1010 may be surrounded by phone case 1020, as shown in FIG. 10. Smartphone 1010 and phone case 1020 may interact in a number of ways. Phone case 1020, as discussed, may include elements that may be activated by smartphone 1010. Specifically, when the smartphone 1010 sends the proper signal using wireless power transmission, the phone case 1020 receives the signal, and the internal elements of the phone case 1020 activate. For example, the smartphone 1010 and the phone case 1020 may send and receive wireless power 1030 (such as Qi power).

However, the smartphone 1010 and the phone case 1020 may use other forms of wireless communication 1040 to communicate. While Bluetooth may be a suitable protocol, other protocols such as ZigBee, Wi-Fi, cellular (3G, 4G Long-Term Evolution (LTE), 5G New Radio (NR), Near-Field Communication (NFC) and so on may also be used in other examples. Alternatively, once the phone case 1020 may be activated, the smartphone 1010 and the phone case 1020 may communicate using a wired connection 1050. Such a wired connection 1050 may involve a connection between a charging plug of the phone case 1020 and a charging port of the smartphone 1010. However, it may also be possible for there to be another physical connection between the smartphone 1010 and the phone case 1020 through which the smartphone and the phone case 1020 can exchange data. For example, the smartphone 1010 may include another port besides a power port, such as a dedicated data port. The phone case 1020 may include a data interface plug that communicates with the smartphone 1010 through its dedicated data port using its data interface plug.

Some embodiments may include provisions for a phone case that includes an integrated cold wallet. In some cases, the cold wallet activates when a smartphone may be placed in the case. In some embodiments, placing the smartphone in the phone case may be detected due to an interaction involving a wireless power signal. In some cases, the case interacts with the phone hardware to activate. In some embodiments, the phone case confirms a physical contact with a smartphone. In some cases, the phone case confirms the identity of a smartphone introduced into the phone case. In some cases, such confirmation uses an IMEI or another form of identification that may be uniquely associated with the smartphone and may be difficult to duplicate.

In some embodiments, the phone case confirms the presence of hardware associated with an account of a user. In some cases, the phone case may gather identifying information from a SIM card associated with the smartphone as a way of confirming the identity of the smartphone. In some embodiments, there may be a button or another control that may be integrated into the smartphone or the phone case, and pushing the button or otherwise activating a control may be a part of the accessing of the cold wallet.

In some embodiments, the phone case interacts with software executed by the smartphone to activate the phone case and the cold wallet included in the phone case. In some cases, the phone case receives an activation request from software executed by the smartphone. In some embodiments, the phone case receives an activation request from an application or a mobile app executed by the smartphone. In some cases, the application or the mobile app sends the activation request when instructed to do so by a user of the smartphone. In some embodiments, the application or the mobile app sends the activation request automatically. In some cases, the application or the mobile app sends the activation request based on a physical action, such as when the smartphone may be introduced into the phone case or when the smartphone otherwise detects that the smartphone and the phone case may be in direct physical contact. In some embodiments, the application or the mobile app sends the activation request when instructed to do so by a user of the application or the mobile app.

In some cases, the phone case receives an activation request from an operating system (OS) of the smartphone. In some embodiments, the smartphone may include a program associated with the OS, such as a background process or a driver. Such a background process or driver may periodically check for the presence of a smartphone that has been introduced into the phone case. In some cases, the phone case may trigger an interrupt or otherwise generate a signal when it receives the smartphone. The OS of the smartphone may then interact with the phone case to provide the necessary credentials so that the smartphone may be able to activate the cold wallet and subsequently perform cryptocurrency transactions.

Some embodiments may include provisions for allowing the smartphone to access the cold wallet integrated into the phone case. In some embodiments, the access expects that the cold wallet may be powered on. In some cases, as discussed above, the powering on may involve a wireless power signal sent by the smartphone to activate the cold wallet, or variants of such an approach. In some embodiments, the credentials provided for access to the cold wallet may be provided using a wireless pairing. In some embodiments, the wireless pairing may be a wireless power pairing. In some cases, the wireless power pairing uses a Qi pairing. In some embodiments, the wireless power pairing uses a PMA pairing instead. In some cases, a Bluetooth paring may be used as the type of wireless pairing. In some embodiments, a Wi-Fi pairing may be used as the type of wireless pairing. In some embodiments, a ZigBee pairing may be used as the type of wireless pairing. In some embodiments, a cellular pairing may be used as the type of wireless pairing. In some cases, the cellular pairing uses 3G, 4G LTE, or 5G NR technologies. In some cases, a Near-Field Communication (NFC) pairing may be used as the type of wireless pairing. In some embodiments, the smartphone obtains access to the cold wallet using a wired pairing. In some cases the wired pairing may be a Universal Serial Bus (USB) pairing. In some cases, the pairing uses a combination of wired and wireless pairing. In some cases, the pairing uses multiple types of wired pairing. In some embodiments, the pairing uses multiple types of wireless pairing.

Figure 11:
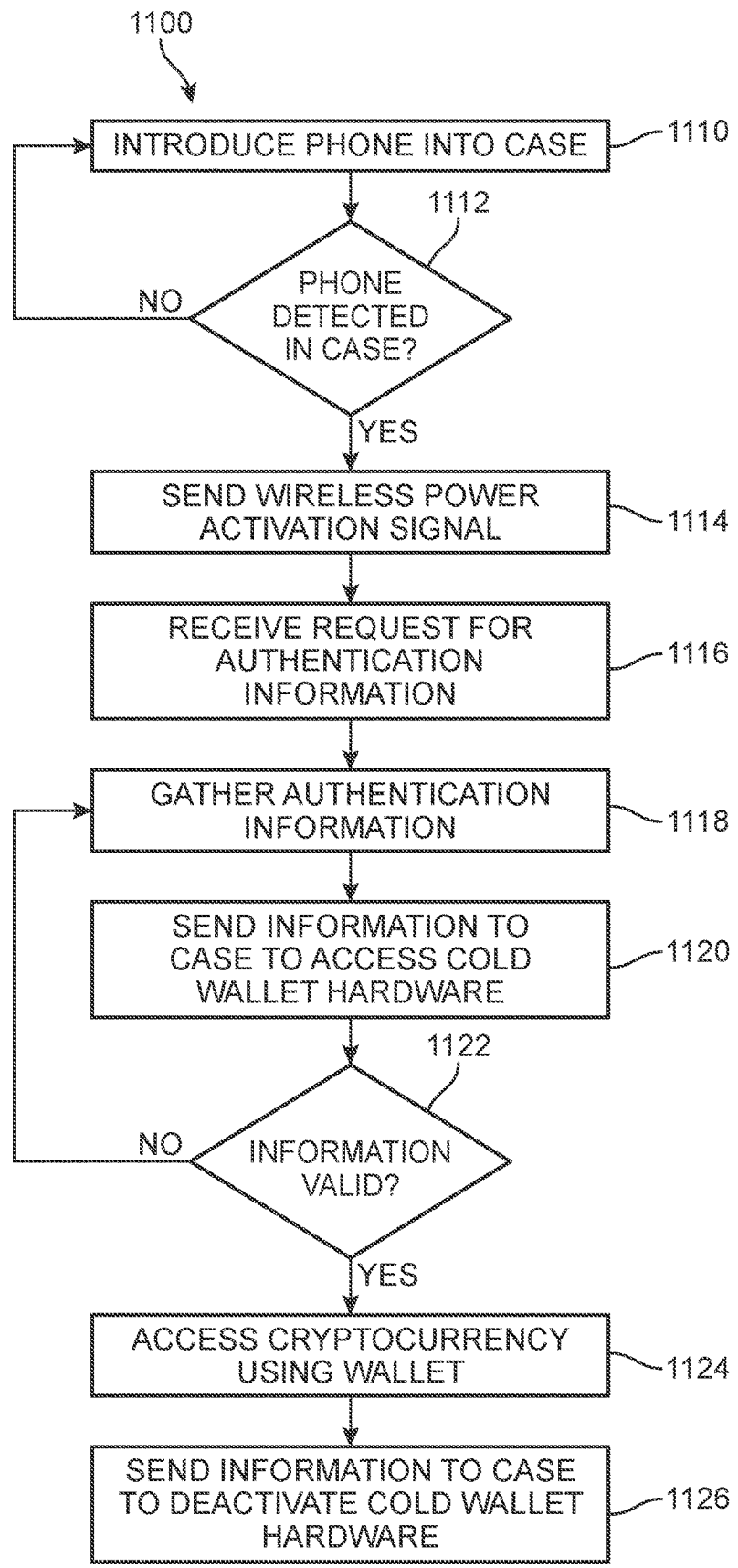
FIG. 11 is a flowchart of an operation process for a cold wallet, according to an embodiment.

FIG. 11 is a flowchart 1100 of an operation process for a cold wallet, according to an embodiment. FIG. 11 is presented from the perspective of how the operation process works from the perspective of the smartphone. In step 1110, a user introduces a smartphone into a phone case. In step 1112, the phone case establishes whether there may be a smartphone detected in the phone case. If not, the method returns to step 1110 and the phone case waits for a smartphone to be placed into the phone case. If the smartphone is detected in the phone case, the method proceeds to step 1114, in which the smartphone sends a wireless power activation signal to the phone case.

For example, such a wireless power activation signal may be sent by a wireless charging component of the smartphone and may be received by a wireless power module of the phone case. The wireless power activation signal may include a specific signal that may be preset for a given phone case that causes the phone case to power up. Once the phone case has powered up, in step 1116, the smartphone receives a request from the phone case for authentication information. While the specifics of the authentication information may vary, the authentication information generally includes both hardware and software credentials establishing the legitimacy of the smartphone. The credentials establish that the user of the smartphone may be entitled to access the cold wallet and may not be abusing the cryptocurrency accounts as a malicious actor. For example, the credentials may confirm the identity of the smartphone and the identity of the user. The credentials may also confirm that an application or app run by the smartphone is sharing correct information with a user and is not providing different information to the user from that provided to the phone case. If the smartphone did so, an infected application could authorize a transaction differing from the user's intent.

In step 1118, the smartphone gathers authentication information. As discussed further below, such authentication information may include hardware credentials associated with the particular smartphone being used. The authentication information may also include software credentials associated with an operating system or an application used by a user to potentially conduct cryptocurrency transactions using the cold wallet. In step 1120, the smartphone sends the authentication to the case to use cold wallet hardware. In step 1122, the phone case determines if the information is valid. If no, the method returns to step 1118 to gather authentication information again for another attempt to access cold wallet hardware. If yes, the method proceeds to step 1124.

Figure 13:
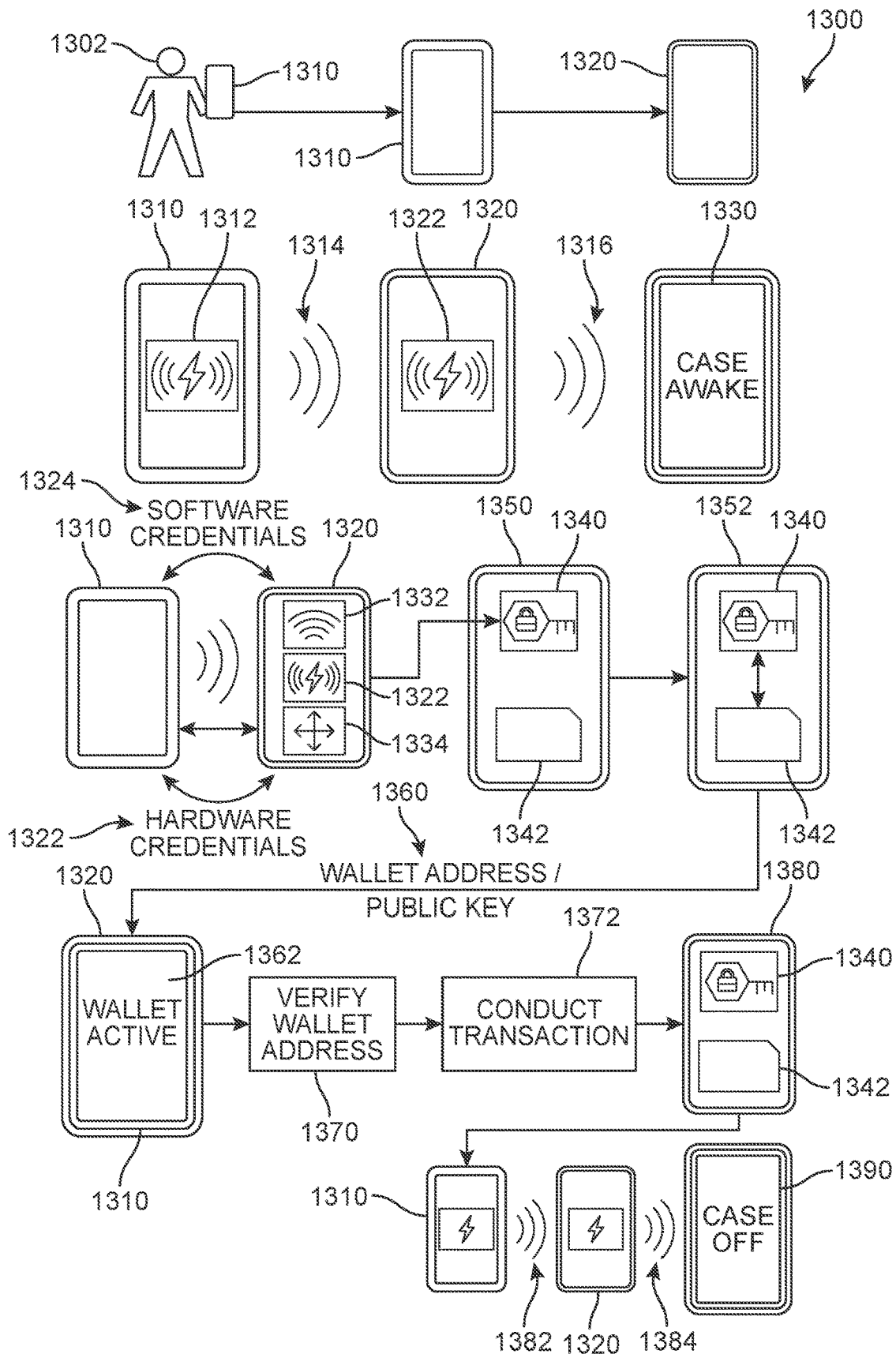
FIG. 13 is an example of a user interacting with the cold wallet, according to an embodiment.
Figure 14:
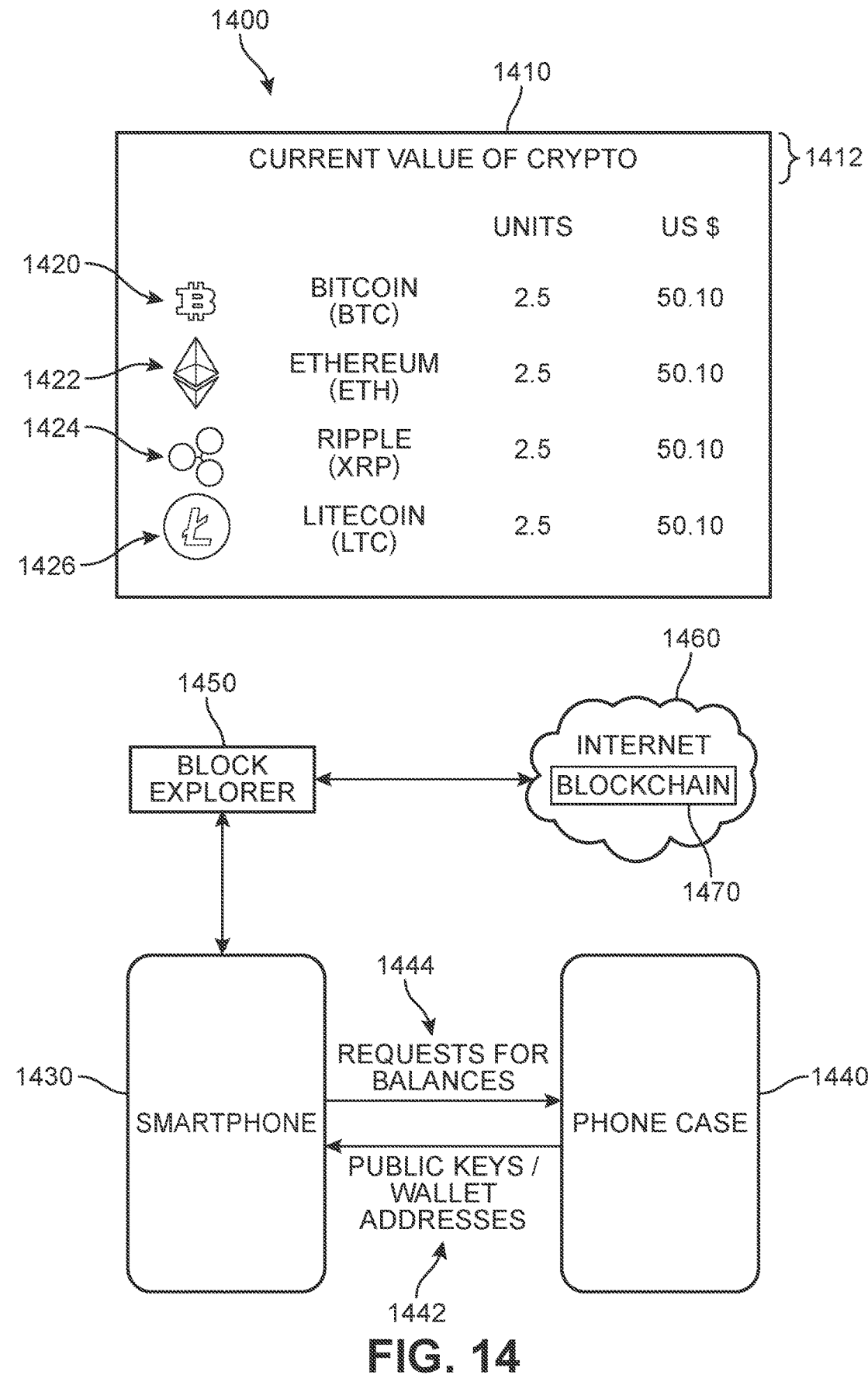
FIG. 14 is an example of using the cold wallet to perform a balance check, according to an embodiment.
Figure 15:
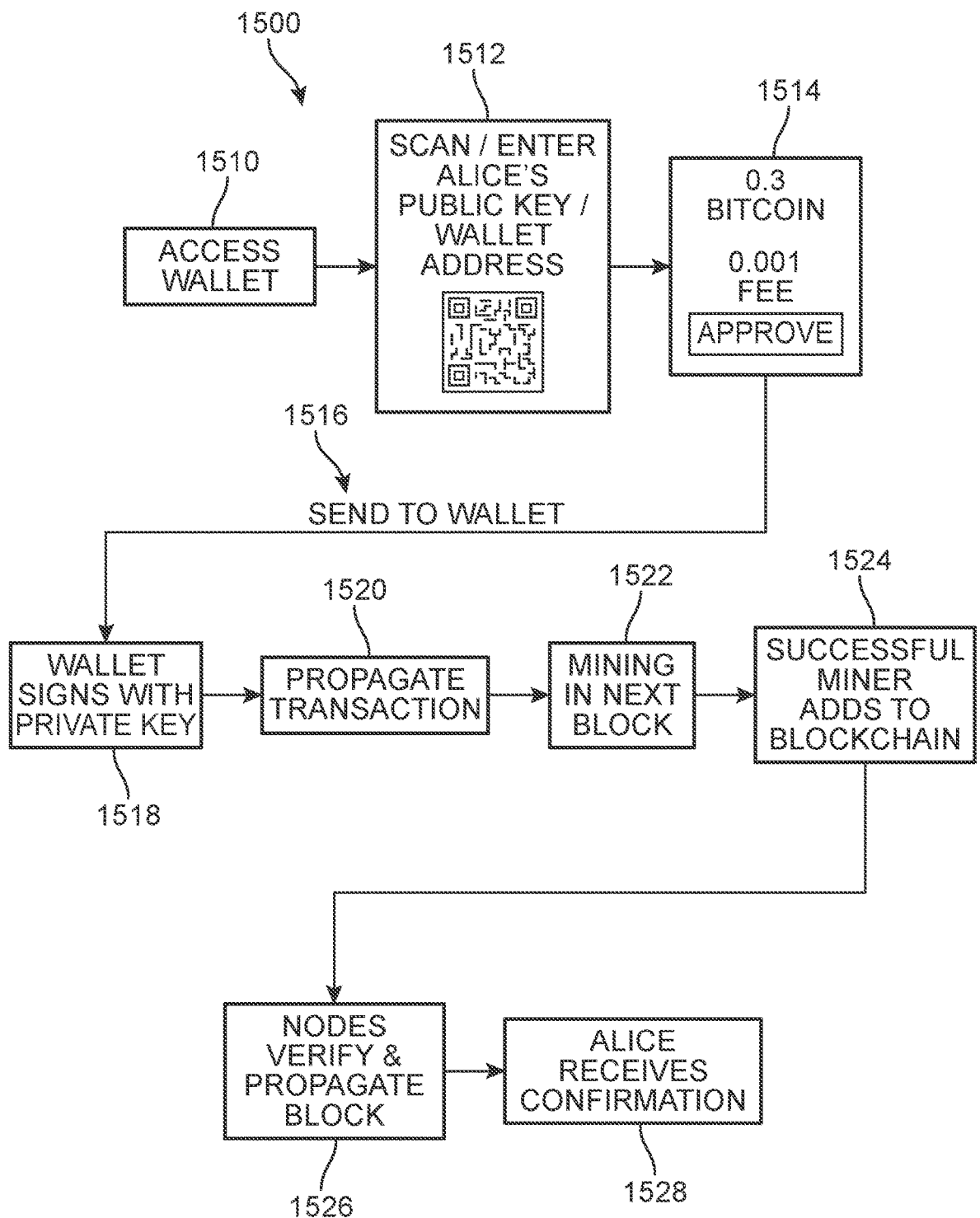
FIG. 15 is an example of steps involved in a cryptocurrency transaction, according to an embodiment.

In step 1124, the method allows the authenticated user (who may be an owner of the smartphone contained in the case or another authorized user) to access cryptocurrency using the cold wallet. This access may take the form of a balance check, as shown in FIG. 14. Alternatively, the access may take the form of receiving funds as shown in FIG. 13, or sending funds, as shown in FIGS. 13 and 15. Once the user of the smartphone may be done accessing his or her cryptocurrency using a wallet in step 1124 (any number of accesses may occur, until the user of the smartphone may be done accessing cryptocurrency), step 1126 may conclude the method.

Specifically, in step 1126, the smartphone sends information to the phone case to deactivate the cold wallet hardware. Such information may be sent using the sent by the wireless charging component of the smartphone and may be received by the wireless power module of the phone case. Such deactivation involves decoupling the secure storage with the security module and powering down the cold wallet hardware. Thus, subsequent to step 1126, the cold wallet hardware will be inert, unusable, and inaccessible until the phone case may be activated again using a wireless power activation signal and then the cold wallet is made accessible with the appropriate credentials. Accordingly, while the private keys associated with cryptocurrency will remain safe, the keys will be protected from malicious access because they may be stored in a secure storage that may be air-gapped until it may be ready for authorized access.

Figure 12:
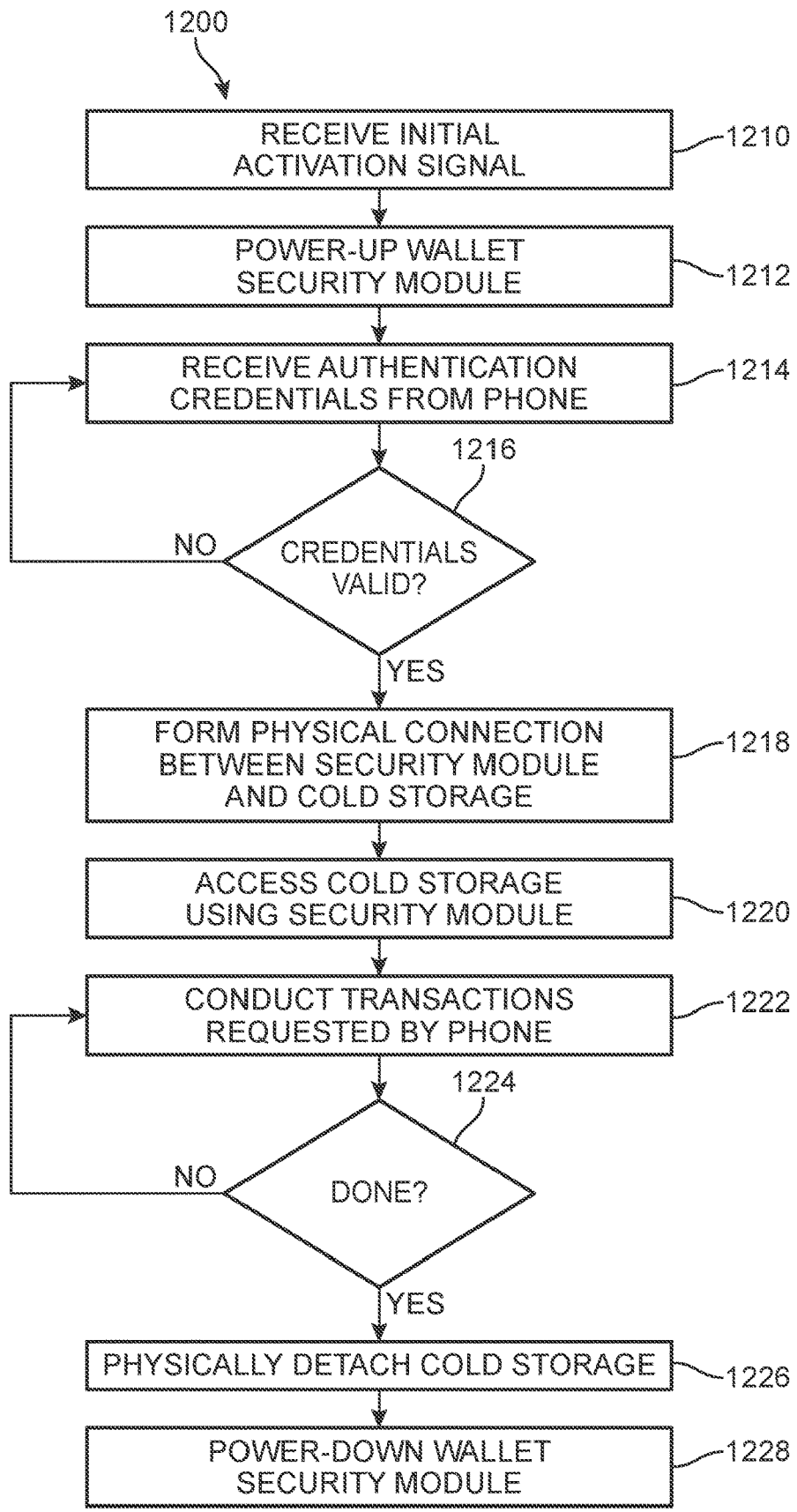
FIG. 12 is another flowchart of an operation process for a cold wallet, according to an embodiment.

FIG. 12 is another flowchart 1200 of an operation process for a cold wallet, according to an embodiment. FIG. 12 is presented from the perspective of how the operation process works from the perspective of the phone case. In step 1210, the process receives an initial activation signal. This step 1210 is the counterpart of step 1114, and the initial activation signal may be from the smartphone to the phone case using data embedded in a wireless power signal. In step 1212, the phone case, in response to receiving the initial activation signal, powers-up the cold wallet security module.

After powering-up, the cold wallet security module may be made ready for step 1214, in which the cold wallet security module receives authentication credentials from the smartphone. Such authentication credentials may include hardware credentials and software credentials, as discussed further in FIG. 13. In step 1216, the phone case may determine if the authentication credentials are valid. If not, the method returns to step 1214 to receive a new set of authentication credentials from the phone. It may be of value to validate credentials prior to initiating access to the cold storage. Such validation protects the key data stored in the cold storage. The private key data may only be used as appropriate to sign a transaction. The required credentials ensure that the private keys may never be misused. If the credentials may be determined to be valid in step 1216, the method proceeds to step 1218.

In step 1218, the phone case forms a physical connection between the security module and the cold storage. Such a physical connection may only be present when the cold storage and the private keys it contains may be about to be actively used. Once the phone case forms the physical connection, in step 1220, the phone case accesses the cold storage using the security module. Thus, the security module receives requests for various types of information and transactions based on the private keys stored in the cold storage. For example, the private keys stored in the cold storage may be used by the security module in three main ways. First, the private keys may be transformed to provide a wallet address or a public key that may be then used to ascertain a balance of one or more types of cryptocurrency associated with the wallet address or the public key. Second, the private keys may be transformed to provide a wallet address or a public key that can then be provided to a sending entity as a destination for cryptocurrency.

The private keys may be used to derive the public key. For example, the public keys may be derived using a one-way cryptographic technique, such as elliptic curve multiplication. The public keys may be further processed using a one-way hashing function to yield a wallet address, such as a Bitcoin address. Generally, to allow another party to send Bitcoin or another cryptocurrency, the receiving party provides the corresponding wallet address. For example, the wallet address may be provided as an alphanumeric string that usually consists of around 25 to 40 alphanumeric characters, which may include numbers, letters (which may be uppercase and/or lowercase) and sometimes special symbols. Alternatively, the public key or wallet address may be presented as a Quick Response (QR) code that may be scanned using a camera or another appropriate scanner that may be able to extract the information included in the QR code.

Third, the private keys may themselves be used to sign a transaction sending funds to another party. Usually, in a wallet (such as a cold wallet), the private keys may be associated with a secret phrase, which may be a collection of 12-24 words (in a human language, such as English) that store the information used to recover and access the funds of a wallet. These words may be sufficient to derive the private key, and hence having access to the secret phrase may be tantamount to having access to the private key. Because the private keys may be stored in cold storage in the phone case, there may be no expectation to store the secret phrase in the phone case, though it may be possible to do so to provide a backup of the private keys. Instead, it may be desirable to store the secret phrase at a secure, separate location.

Thus, in step 1222, the phone case conducts transactions as requested by the phone. After each transaction (which may be a balance check, sending cryptocurrency, or receiving cryptocurrency), the phone case performs step 1224, which may be a check to see if the smartphone may be done with cryptocurrency transactions. For example, step 1224 may involve the phone case receiving a command from the smartphone. Such a command to stop transactions may be initiated by a user using an interface of the smartphone or may be automatically generated after a certain transaction. Alternatively, in step 1224, the phone case may decide that there may be no further transactions after a certain number of transactions, which may be one transactions or two or more transactions.

The phone case may also shut down after a certain amount of time elapses, or if the phone case receives a command spoken by the user. The phone case will also determine that the phone case may be done with transactions when the phone case may be physically removed from the smartphone. If step 1224 determines that the phone may not be done with transactions, the method returns to step 1222 to allow more transactions. If step 1224 determines that the phone may be done with the transactions, in step 1226, the phone case physically detaches the cold storage from the security module. Subsequently, in step 1228, the phone case powers-down the cold wallet security module. After step 1228, the method may begin again at step 1210 when the phone case may be to provide access to the cold wallet.

FIG. 13 is an example 1300 of a user interacting with the cold wallet, according to an embodiment. In FIG. 13, a user 1302 holds a smartphone 1310. While FIG. 13 shows the use of a smartphone 1310, it may be recognized that other devices such may be adapted for use in other embodiments. As shown in FIG. 13, the user inserts smartphone 1310 into phone case 1320. Smartphone 1310 includes a wireless power module 1312, which sends a wireless power signal 1314 to phone case 1320, where the wireless power signal 1314 may be received by wireless power module 1322 of the phone case 1320.

The phone case 1320 then causes the wireless power module 1322 to send a wireless power signal 1316 to phone case 1320. While not shown, the wireless power signal 1316 may be received by wireless power module 1312 of the phone case 1320. The receipt of the wireless power signal 1316 causes a display 1330 of the smartphone 1310 to display a message such as "CASE AWAKE." Such a message indicates that the phone case 1320 may be ready to exchange credentials with the smartphone 1310 to initial cryptocurrency transactions. Thus, the smartphone 1310 provides credentials for reception by the phone case 1320. Such credentials may include hardware credentials 1322, software credentials 1324, or a combination of both of these types of credentials.

For example, hardware credentials 1322 might include data provided by a SIM card, or an IMEI number of the smartphone 1310. These hardware credentials 1322 may be a part of a proof that a user may be using a smartphone 1310. The software credentials 1324 might include a combination of information from a mobile app or an operating system as provided by the smartphone 1310. For example, such information might include a variety of information identifying a user or a user account to access using the phone case. The hardware credentials 1322 and software credentials 1324 establish which keys the user may be able to access for cryptocurrency transactions. The hardware credentials 1322 and software credentials 1324 may be received by a wireless transmission or a wired transmission of information from the smartphone 1310 to phone case 1320.

For example, wireless communications module 1332 may allow communication based on a protocol such as Bluetooth, Wi-Fi, cellular (3G, 4G LTE, 5G NR, etc.), ZigBee, Near-Field Communication (NFC), and so on. As an alternative, wireless power module 1322 of the phone case 1320 may also provide the capability to exchange credential information, rather than solely using a signal associated with wireless power to turn the phone case 1320 on. As another alternative, the smartphone 1310 may send hardware credentials 1322 and software credentials 1324 using a physical connection between the smartphone 1310 and the phone case 1320. For example, there may be a physical connection between the smartphone 1310 and the phone case 1320, such as through a charge port of the smartphone 1310 and a connector of the phone case 1320. The physical data exchange may be managed by a wired communication module 1334.

Diagram 1350 shows two of the components of the phone case 1320. Specifically, diagram 1350 includes security module 1340 and cold storage 1342. Once security module 1340 receives the appropriate hardware credentials 1322 and software credentials 1324, diagram 1352 shows that security module 1340 may be physically connected to cold storage 1342. For example, such a physical connection may involve using an electronically controlled switch that allows security module 1340 to interact with cold storage 1342 only when authorized. The switch may turn on and forms the physical connection only for a limited time when the security module 1340 may be actively authorized to access the private keys stored in cold storage 1342.

Once the security module 1340 accesses the cold storage 1342, it then uses the private key or keys stored in the cold storage 1342 to derive a wallet address and/or public key 1360 to be sent to the smartphone 1310, which is shown as being in the phone case 1320. At this point, the smartphone 1310 may display a message 1362 that indicates that the cold wallet may be active. A step 1370 occurs in which the security module 1342 verifies a wallet address. Step 1372 involves conducting a transaction. The nature of steps 1370 and 1372 vary depending on the nature of the transaction. The transaction may be a balance check, a receipt of cryptocurrency, or a transmission of cryptocurrency.

Based on the transaction type, step 1370 may take advantage of the secure information interchange between the smartphone 1310 and the phone case 1320 to ensure that the correct wallet address may be being used. Steps 1370 and 1372 may also use the secure information interchange between the smartphone 1310 and the phone case 1320 to ensure that the correct parameters of the transaction may be used to conduct the transaction. While step 1372 refers to conducting a single transaction, step 1372 may be performed multiple times and multiple transactions may be performed.

Once the transaction or transactions are complete, diagram 1380 applies. Diagram 1380 shows that security module 1340 and the cold storage 1342 are not physically connected any more. Thus, the private keys stored in cold storage 1342 may no longer be accessible. To conclude the process shown in FIG. 13, the smartphone 1310 sends a wireless power signal 1382 to phone case 1320. As an option additional step, the phone case 1320 sends another wireless power signal 1384. Diagram 1390 shows that smartphone 1310 displays "CASE OFF." Alternately the user 1302 may physically remove the smartphone 1310 from the phone case 1320. This action will also cause the smartphone 1310 to display "CASE OFF."

Some embodiments may include provisions for accessing keys associated with the cold wallet. In some embodiments, the cold wallet may be accessed using a wallet address. Such a wallet address may be used when attempting to ascertain a balance associated with the cold wallet or when providing a destination so that additional parties can send cryptocurrency to the cold wallet. In some embodiments, the wallet address may be a hashed string derived from at least one private key. In some cases, the wallet address may be provided as a QR code derived from at least one private key. In some embodiments, the cold wallet uses actual keys. In some cases, the cold wallet uses public keys and private keys. The public keys may be derived using cryptographic techniques from the private keys.

In some cases, the cold wallet uses private keys for transactions. Such private keys may be stored in cold storage when not used. In some embodiments, there may be a single private key, and only a single-signature may be necessary. In some cases, the cold wallet may be a multiple-signature (multi-sig) wallet. In a multi-sig wallet, multiple private keys may be used to sign a transaction. In some embodiments, all of the private keys associated with the cold wallet may be used to sign a transaction. In some cases, a subset of the private keys associated with the cold wallet may be sufficient.

Some embodiments may include provisions for obtaining access to the cold wallet to perform various cryptocurrency transactions. In some embodiments, the cold wallet may be accessible to use the information stored inside to conduct transactions. That is, access occurs only after the phone case has been activated. In some cases, the cold wallet uses additional credentials to become accessible for conducting transactions, as discussed above. In some embodiment, the access to the cold wallet, once activated, includes a request for a wallet balance. In some cases, such a balance may correspond to a single cryptocurrency account consisting of a single type of cryptocurrency. In some cases, the balance may correspond to multiple accounts, which may correspond to multiple types of cryptocurrency.

In some embodiments, requesting the cold wallet balance involves using a block explorer. In some cases, the cold wallet provides a public key to the block explorer. Such a public key may be obtained from private keys at the cold wallet using a cryptographically secure, one-way technique such as elliptic curve multiplication. In some embodiments, the cold wallet provides a wallet address to the block explorer. Such a wallet address may be further obtained by performing a hashing operation on the public key. Whether a public key or a wallet address may be provided to the block explorer, the public key or wallet address identifies the cryptocurrency account or accounts on the blockchain that may be associated with the user.

In some cases, the block explorer traverses the blockchain using the public key or wallet address, compiling cryptocurrency balances associated with the account. In some embodiments, block explorer traverses the blockchain using the public key or wallet address and gathers information about an overall history of transactions associated with the corresponding account. In some cases, the block explorer traverses the blockchain and gathers detailed information about a specific transaction or specific transactions. In some embodiments, rather than using a block explorer, requesting the balance involves tracking cryptocurrency tractions locally at the phone case.

In some embodiments, the cold wallet provides the ability to receive funds using the cold wallet. In some cases, the cold wallet may be able to receive funds by providing account information to a sending party. In some cases, the cold wallet electronically shares account information with a sending party to allow the sending party to send cryptocurrency. In some cases, the cold wallet sends a public key to the sending party. In some embodiments, the cold wallet sends a wallet address derived by hashing instead of sending the actual public key.

In some cases, the wallet address may be provided as a Quick Response (QR) code or a hashed string in a variety of ways. In some embodiments, the public key or wallet address may be provided to a sending party manually. A smartphone may show the string or cut and paste the string to the sending party. The smartphone could also use a secure messaging protocol to provide the string. The smartphone could also show a QR code to a sending party, which will allow the sending party to determine how to send cryptocurrency to the smartphone. In some cases, the secure trust relationship between the smartphone and the phone case allows the phone case to be confident that the smartphone will not compromise the account information when sharing the account information with the sending party.

In some embodiments, the cold wallet sends funds to a destination account. In some cases, the cold wallet sends funds using a public key associated with a receiver of the funds. In some embodiments, the cold wallet sends funds using a wallet address associated with a receiver of the funds. In some cases, the wallet address may be obtained by taking a picture of a QR code corresponding to the receiver of the funds. In some embodiments, the cold wallet may be selected as a destination by entering a wallet address as an alphanumeric string.

FIG. 14 is an example 1400 of using the cold wallet to perform a balance check, according to an embodiment. For example, a display 1410 of a smartphone 1430 may share information about cryptocurrency associated with a cold wallet embedded in a phone case 1440. For example, the smartphone 1430 may make a request for balances 1444, such as in response to a request made by a user of the smartphone 1430, once the smartphone 1430 is properly authenticated. In response, the phone case 1440 sends public keys or wallet addresses 1442 associated with the cryptocurrency wallet.

The public keys or wallet addresses 1442 allow the device 1430 to track transactions associated with the cold wallet on the blockchain, which establishes balances of various types of cryptocurrency associated with the cold wallet. Specifically, the smartphone 1430 sends the public keys 1442 to a block explorer 1450. A block explorer 1450 is an online tool that enables a user to search for real-time and historical information about a blockchain, including data related to blocks, transactions, addresses, and more. Thus, block explorer 1450 traverses the blockchain 1470, which may be distributed across the Internet 1460. The display 1410 of smartphone 1430 shows multiple pieces of information about balances of cryptocurrency of various types associated with the cold wallet. For example, header 1412 indicates that the display 1410 is showing the current amount and value of various cryptocurrencies.

For example, the display 1410 shows icons, names, and symbols identifying various types of cryptocurrency. The display 1410 also shows a quantity of units of each cryptocurrency, as well as a current value of the cryptocurrency of that type in U.S. Dollars. However, it may also be possible that the value of cryptocurrencies could be displayed in another standard currency issued by a government (Euros, Japanese Yen, Chinese Yuan, etc.). The display 1410 shows information about sample types of cryptocurrency associated with the cold wallet including an amount of Bitcoin 1420, an amount of Ethereum 1422, an amount of Ripple 1424, and an amount of Litecoin 1426.

However, these are only examples of cryptocurrency, and other altcoins maintained on a blockchain 1470 may also be tracked by using public keys to access the blockchain 1470 using a block explorer 1450. Part of the nature of cryptocurrency is that the blockchain 1470 is redundant and publicly available. Thus, using public keys or wallet addresses 1442 allows a determination of balances of cryptocurrency without jeopardizing the underlying security of the accounts in that no actual transfer or reassignment of cryptocurrency in an account can occur without access to private keys. As discussed above, private keys may be protected in the cold wallet using a number of security measures, which may include proximity and other authentications such as usernames, passwords, PINs, biometric identifiers, and so on.

FIG. 15 is an example 1500 of steps involved in a cryptocurrency transaction, according to an embodiment. In the cryptocurrency transaction, a user desires to send cryptocurrency to another user of the blockchain, who may be named Alice, as an example. In step 1510, a user of the smartphone accesses the cold wallet so the smartphone will cause the cold wallet's security module to have access to the private keys used to sign the cryptocurrency transaction to transfer cryptocurrency to Alice. In step 1512, the smartphone acquires Alice's public key or wallet address. For example, step 1512 shows that Alice provides a Quick Response (QR) code that may be captured by a camera of the smartphone and decoded to yield Alice's wallet address. However, Alice may provide the public key or wallet address using other methods. The other methods may include using some form of wireless communication, sending a message over the Internet, or even entering the public key or wallet address manually as an alphanumeric string or a hexadecimal string.

Once Alice has provided the public key or wallet address in step 1512, the user of the smartphone can authorize a cryptocurrency transaction in step 1514. For example, the user may wish to send 0.3 Bitcoin to Alice, and pay a fee of 0.001 Bitcoin for conducting the transaction. The user then sends the transaction to the cold wallet in step 1516. Such a step may be moderated by the security module of the phone case. In step 1518, the cold wallet signs the transaction with the private key to which it has access, using the security module to interact with the secure storage in which the keys are protected. In step 1520, the cold wallet propagates the transaction throughout the blockchain. Once the transaction may be introduced into the blockchain, it becomes a candidate for step 1522, in which the transaction may be a candidate for mining in the next block. In step 1524, a successful miner adds the transaction to the blockchain. Once this has been accomplished, in step 1526, nodes verify and propagate the block that has been added by the miner. As part of this propagation, in step 1528, Alice receives a confirmation that she has received the relevant funds. The confirmation may also include a confirmation that the funds were successfully sent.

Thus, the embodiments discussed herein provide for a cold wallet. The cold wallet offers many of the advantages that may be typical for a cold wallet. For example, the private key may be unexposed because it may not be stored on a computer or directly accessible by the Internet. Additionally, the cold wallet may be capable of storing multiple cryptocurrencies in the same cold wallet. Because the cold wallet may not be directly accessible by the Internet, it may not be vulnerable to viruses and malware. Furthermore, only transactions that are verified using the stored private keys may be conducted.

However, the particular cold wallet presented herein offers several additional advantages. The cold wallet includes robust security features, including features that use surface to surface proximity. For example, while existing security protocols exchange credentials such as passcodes and biometrics, the cold wallet uses a two-stage process where wireless charging may be used to even turn the cold wallet on. Such a process increases the security of embodiments by ensuring that the cold wallet is only accessible in secure ways.

Further, the integration of the cold wallet into the phone case may not only be secure, but may be more convenient. In general, it may be easy to use a cold wallet integrated into the phone case because it will be convenient to place the smartphone into the phone case. When the smartphone is in the phone, the surface to surface proximity criterion may be satisfied. It may be unlikely that a phone case will be lost, and the phone case can continue to verify that the surface to surface proximity may be maintained as transactions may be completed.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smartphones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A phone case configured to receive a smartphone, comprising:
   a cold storage memory module embedded in the phone case, the cold storage memory module storing at least one private key associated with a cryptocurrency account;
   a wireless power module embedded in the phone case;
   a security module embedded in the phone case and coupled to the wireless power module, configured to:
   receive, as the smartphone is inserted into the phone case, an activation signal from the smartphone at the wireless power module, the activation signal being sent using a wireless charging protocol;

power up the phone case in response to receiving the activation signal from the smartphone;

send a request to the smartphone for authentication credentials;

receive authentication credentials from the smartphone;

validate the authentication credentials from the smartphone;

in response to the authentication credentials being valid, form a physical connection between the security module and the cold storage memory module;

receive a request for a cryptocurrency transaction associated with the cryptocurrency account from the smartphone;

conduct the cryptocurrency transaction requested by the smartphone using the at least one private key; and power down the phone case when the smartphone is removed from the phone case.

2. The phone case of claim 1, wherein the security module receives the activation signal when the security module detects that the smartphone has been introduced into the phone case.

3. The phone case of claim 1, wherein in response to the security module determining that no additional cryptocurrency transactions are necessary, the security module is further configured to detach the physical connection with the cold storage memory module and to power down the phone case.

4. The phone case of claim 1, wherein the authentication credentials include at least one of hardware authentication credentials identifying the smartphone and software authentication credentials identifying at least one of a user of the smartphone and a cryptocurrency account of the user of the smartphone.

5. The phone case of claim 1, wherein the cold storage memory module includes a memory that stores the private keys that is only accessible when the phone case is powered on and the security module is physically connected to the cold storage memory module.

6. The phone case of claim 1, wherein the phone case further includes at least one of a wireless communication module and a wired communication module and the phone case receives the authentication credentials using at least one of the wireless power module, the wireless communication module, and the wired communication module.

7. The phone case of claim 1, wherein the cryptocurrency transaction includes one of performing a balance check, receiving cryptocurrency, and sending cryptocurrency, and wherein parameters for the cryptocurrency transaction are confirmed by a secure interaction between the smartphone and the phone case using the security module.

8. The phone case of claim 1, wherein the security module is further configured to, in response to a determination that the authentication credentials are invalid, receive a new set of authentication credentials.

9. The phone case of claim 1, wherein the validating comprises identifying the smartphone using hardware credentials of the smartphone and comparing the authentication credentials to at least one of user information and account information stored in a storage of the phone case.

10. The phone case of claim 1, wherein the security module derives a public key from the at least one private key using elliptic curve multiplication.

11. The phone case of claim 10, wherein the security module derives a wallet address using a hashing function on the public key.

12. The phone case of claim 1, wherein the cryptocurrency transaction includes performing a balance check and the conducting the cryptocurrency transaction includes using the security module for deriving at least one of a public key and a wallet address from the at least one private key and using a block explorer to determine a cryptocurrency balance using the at least one of the public key and the wallet address.

13. The phone case of claim 1, wherein the cryptocurrency transaction includes receiving cryptocurrency and the conducting the cryptocurrency transaction includes using the security module for deriving at least one of a public key and a wallet address from the at least one private key and providing at least one of the public key and the wallet address to the smartphone as a destination address for receipt of funds.

14. The phone case of claim 1, wherein the cryptocurrency transaction includes sending cryptocurrency and the conducting the cryptocurrency transaction includes receiving at least one of a public key and a wallet address that is a destination for the cryptocurrency from the smartphone and using the security module to use the at least one private keys from the cold storage memory module to sign the cryptocurrency transaction.

15. The phone case of claim 1, wherein the activation signal includes a specific signal that is preset for the phone case and causes the phone case to power up.

16. The phone case of claim 1, wherein the authentication credentials include both hardware and software credentials establishing a legitimacy of the smartphone.

17. The phone case of claim 12, wherein the wallet address is presented as a Quick Response (QR) code that may be scanned to extract information included in the QR code.

18. The phone case of claim 1, further comprising a data interface plug that enables communication with the smartphone through a dedicated data port.

19. The phone case of claim 9, wherein the hardware credentials of the smartphone include an International Mobile Equipment Identity (IMEI) number identifying the smartphone.

20. The phone case of claim 9, wherein the hardware credentials of the smartphone include information from a Subscriber Identity Module or Subscriber Identification Module (SIM) card or chip embedded in the smartphone.

* * * * *